(12) United States Patent
Mitsuda et al.

(10) Patent No.: US 9,140,154 B2
(45) Date of Patent: Sep. 22, 2015

(54) ENGINE DEVICE

(75) Inventors: Masataka Mitsuda, Osaka (JP); Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 380 days.

(21) Appl. No.: 12/998,002

(22) PCT Filed: Sep. 7, 2009

(86) PCT No.: PCT/JP2009/065600
§ 371 (c)(1),
(2), (4) Date: Mar. 8, 2011

(87) PCT Pub. No.: WO2010/032646
PCT Pub. Date: Mar. 25, 2010

(65) Prior Publication Data
US 2011/0154809 A1 Jun. 30, 2011

(30) Foreign Application Priority Data

Sep. 18, 2008 (JP) .................... 2008-239400
Sep. 18, 2008 (JP) .................... 2008-239401

(51) Int. Cl.
*F01N 3/00* (2006.01)
*F01N 3/021* (2006.01)
(Continued)

(52) U.S. Cl.
CPC .............. *F01N 3/0211* (2013.01); *E02F 9/00* (2013.01); *E02F 9/0866* (2013.01);
(Continued)

(58) Field of Classification Search
CPC ...... E02F 9/00; E02F 9/0866; F01N 13/0093; F01N 13/0097; F01N 13/1805; F01N 13/1855; F01N 13/1894; F01N 3/0211; F01N 3/0335; F01N 2470/02; F01N 2470/18; F01N 2590/08; F02M 35/10144; F02M 35/10288

USPC .................................. 60/286, 295, 297
See application file for complete search history.

(56) References Cited

U.S. PATENT DOCUMENTS 3,243,011 A * 3/1966 Hill .............................. 181/274
4,167,852 A * 9/1979 Ludecke ........................ 60/296
(Continued)

FOREIGN PATENT DOCUMENTS

EP          1 321 640        6/2003
JP          2000-145430      5/2000
(Continued)

OTHER PUBLICATIONS

Microfilm of the specification and drawings annexed to the request of Japanese Utility Model Application No. 3536/1991 (Laid-open No. 93712/1992) (Tokyo Roki Co., Ltd.) Aug. 14, 1992, paragraph [0008]; fig. 1 (Family: none) JP 4-73712 (Aug. 14, 1992).

*Primary Examiner* — Jason Shanske
*Assistant Examiner* — Matthew T Largi
(74) *Attorney, Agent, or Firm* — Jordan and Hamburg LLP

(57) ABSTRACT

Disclosed is an engine device in which a diesel particulate filter is disposed, with high rigidity, in an engine as one constituent part of the engine, the need for countermeasures against exhaust gas for each of the devices of a vehicle is eliminated, and general versatility of the engine can be enhanced. The engine device includes an engine having an exhaust manifold, and an exhaust gas purifying device which purifies exhaust gas discharged from the engine. A plurality of filter supporting bodies which support the exhaust gas purifying device 1 are provided in a cylinder head of the engine. The diesel particulate filter is connected to the exhaust manifold, and is also connected to the cylinder head by the plurality of filter supporting bodies.

3 Claims, 29 Drawing Sheets

(51) Int. Cl.
  *E02F 9/00* (2006.01)
  *E02F 9/08* (2006.01)
  *F01N 3/033* (2006.01)
  *F01N 13/18* (2010.01)
  *F01N 13/00* (2010.01)
  *F02M 35/10* (2006.01)

(52) U.S. Cl.
  CPC ......... *F01N 3/0335* (2013.01); *F01N 13/0093* (2014.06); *F01N 13/0097* (2014.06); *F01N 13/1805* (2013.01); *F01N 13/1855* (2013.01); *F01N 13/1894* (2013.01); *F01N 2470/02* (2013.01); *F01N 2470/18* (2013.01); *F01N 2590/08* (2013.01); *F02M 35/10144* (2013.01); *F02M 35/10288* (2013.01); *Y02T 10/20* (2013.01)

(56) References Cited

U.S. PATENT DOCUMENTS

| | | | |
|---|---|---|---|
| 4,506,749 A | 3/1985 | Sieren | |
| 5,590,522 A * | 1/1997 | Kynsilehto et al. | 60/299 |
| 5,732,555 A * | 3/1998 | Gracyalny et al. | 60/299 |
| 6,106,344 A | 8/2000 | Mashiko | |
| 6,789,644 B2 * | 9/2004 | Mukaida | 181/272 |
| 6,983,728 B1 * | 1/2006 | Banks et al. | 123/198 R |
| 8,327,629 B2 * | 12/2012 | Masuda et al. | 60/296 |
| 8,365,518 B2 * | 2/2013 | Ezawa et al. | 60/297 |
| 8,418,448 B2 * | 4/2013 | Kamata et al. | 60/322 |
| 2006/0021593 A1 | 2/2006 | Banks, Jr. et al. | |
| 2010/0086446 A1 | 4/2010 | Matsunaga et al. | |
| 2011/0005853 A1 * | 1/2011 | Kamiya | 180/296 |
| 2011/0192671 A1 * | 8/2011 | Mitsuda et al. | 180/309 |

FOREIGN PATENT DOCUMENTS

| | | | |
|---|---|---|---|
| JP | 2001-173429 | 6/2001 | |
| JP | 2002-285836 | 10/2002 | |
| JP | 2003-027922 | 1/2003 | |
| JP | 2003-041931 | 2/2003 | |
| JP | 2004-340114 | 12/2004 | |
| JP | 2004340114 A * | 12/2004 | F01N 7/00 |
| JP | 2005-016374 | 1/2005 | |
| JP | 2005016374 A * | 1/2005 | F01N 3/02 |
| JP | 3671158 | 7/2005 | |
| JP | 2007-056627 | 3/2007 | |
| JP | 2008-082201 | 4/2008 | |

* cited by examiner

ENGINE DEVICE

TECHNICAL FIELD

The present invention of this application relates to an engine device used for a utility machine such as a backhoe, a forklift, and a tractor, and more particularly, to a mounting structure of an exhaust gas purifying device on an engine.

BACKGROUND OF THE INVENTION

Conventionally, there has been a technique in which a diesel particulate filter (or NOx catalyst) is provided in an exhaust passage of a diesel engine as an exhaust gas purifying device (postprocessing device), and exhaust gas discharged from the diesel engine is purified by the diesel particulate filter (or NOx catalyst) (see Patent Documents 1, 2 and 3). There has also been a technique in which a filter case (inner case) is provided in a casing (outer case) and a particulate filter is disposed in the filter case (see Patent Document 4).

CITATION LIST

Patent Document 1: Japanese Patent Application Laid-open No. 2000-145430
Patent Document 2: Japanese Patent Application Laid-open No. 2003-27922
Patent Document 3: Japanese Patent Application Laid-open No. 2008-82201
Patent Document 4: Japanese Patent Application Laid-open No. 2001-173429

SUMMARY OF THE INVENTION

Diesel engines have wide general versatility, and are used in various fields such as agricultural utility machines, construction machines, and vessels. Installation spaces of diesel engines vary depending upon machines in which the diesel engines are provided, and in recent years, the installation spaces are limited (narrow) in many cases due to requests for reducing weight and size. Further, in the above-described exhaust gas purifying device, it is desirable in terms of function that a temperature of exhaust gas which passes through the exhaust gas purifying device is high (e.g., 300° C. or higher). For this reason, it is required to mount the exhaust gas purifying device in the diesel engine.

When the exhaust gas purifying device is mounted in the diesel engine, however, there are problems that engine vibration is prone to be transmitted directly to the exhaust gas purifying device by the driving operation, and that if cooling wind from a cooling fan provided in the diesel engine is blown directly to the exhaust gas purifying device, a temperature of the exhaust gas purifying device and thus the temperature of the exhaust gas could be lowered.

Hence, it is an object of the invention of the application to meet such requirements.

To achieve the above object, there is provided an engine device comprising an engine having an exhaust manifold, and an exhaust gas purifying device which purifies exhaust gas from the engine, wherein a cylinder head of the engine includes filter support bodies which supports the exhaust gas purifying device, the exhaust gas purifying device is connected to the exhaust manifold, and is also connected to the cylinder head through the filter support bodies.

According to the invention, in the engine device, one end and the other end of the exhaust gas purifying device in its longitudinal direction are detachably connected to the cylinder head through the filter support bodies.

According to the invention, in the engine device, the exhaust gas purifying device is long along an output shaft of the engine, and is disposed on the cylinder head at a position close to the exhaust manifold.

According to the invention, in the engine device, an exhaust gas inflow opening and an exhaust gas outflow opening are disposed on the one end and the other end of the exhaust gas purifying device in its longitudinal direction.

According to the invention, in the engine device, an intake manifold and the exhaust manifold are disposed on an upper portion of the engine on both sides of the cylinder head of the engine as viewed from above, and the exhaust gas purifying device is connected to the exhaust manifold and the intake manifold above the engine.

According to the invention, in the engine device, a cooling fan is provided on one side surface of the engine, a flywheel housing is provided on a side surface of the engine opposite to the cooling fan, the exhaust gas purifying device is long in a direction perpendicular to an output shaft of the engine, and the exhaust gas purifying device is disposed on the cylinder head at a position close to the flywheel housing.

According to the invention, in the engine device, the exhaust manifold and an exhaust gas inlet tube connected to an exhaust gas inflow opening of the exhaust gas purifying device are detachably connected to each other through a relay exhaust tube.

According to the invention, in the engine device, a portion of the exhaust gas purifying device at a position close to the intake manifold is detachably connected to the intake manifold through the filter support bodies.

The invention of this application provides an engine device including an engine having an exhaust manifold, and an exhaust gas purifying device which purifies exhaust gas from the engine, wherein a cylinder head of the engine includes filter support bodies which supports the exhaust gas purifying device, the exhaust gas purifying device is connected to the exhaust manifold, and is also connected to the cylinder head through the filter support bodies. Therefore, there are effects that the exhaust gas purifying device can be disposed in the engine with high rigidity as one constituent part of the engine, the need of countermeasures against exhaust gas for each of devices of a utility vehicle is eliminated, and general versatility of the engine can be enhanced.

That is, the exhaust gas purifying device is supported with high rigidity by utilizing the cylinder head which is a high rigidity part of the engine, and it is possible to prevent the damage of the exhaust gas purifying device caused by vibration. There are advantages that the exhaust gas purifying device can be assembled into the engine at a production site of the engine and the engine can be shipped out, and the engine and the exhaust gas purifying device can be configured together compactly.

According to the invention, one end and the other end of the exhaust gas purifying device in its longitudinal direction are detachably connected to the cylinder head through the filter support bodies. Therefore, the exhaust gas purifying device can be connected to the engine with high rigidity so as to be supported at three points using the exhaust manifold and the filter support bodies, and this is effective for preventing the exhaust gas purifying device from being damaged by vibration.

According to the invention, the exhaust gas purifying device is long along an output shaft of the engine, and is disposed on the cylinder head at a position close to the exhaust manifold. Therefore, the intake manifold of the cylinder head having many fine parts can be exposed, which facilitates the maintenance operation of the engine. The exhaust gas purifying device can be communicated with the exhaust manifold within a short distance, and the reduction in temperature of exhaust gas which passes through the exhaust gas purifying device can be suppressed as small as possible. Therefore, it is possible to maintain the exhaust gas purifying ability of the exhaust gas purifying device at a high level.

According to the invention, an exhaust gas inflow opening and an exhaust gas outflow opening are disposed on the one end and the other end of the exhaust gas purifying device in its longitudinal direction. Therefore, the exhaust gas purifying device can be supported in a state where it is close to an upper surface of the cylinder head. Thus, it is possible to show a high effect for preventing the damage of the exhaust gas purifying device caused by vibration, while utilizing rigidity of the cylinder head.

According to the invention, the intake manifold and the exhaust manifold are disposed on an upper portion of the engine on both sides of the cylinder head of the engine as viewed from above, and the exhaust gas purifying device is connected to the exhaust manifold and the intake manifold above the engine. By utilizing the exhaust manifold, the intake manifold, and the cylinder head which are high rigidity parts of the engine, the exhaust gas purifying device can be supported with higher rigidity. Thus it is possible to effectively prevent the exhaust gas purifying device from being damaged by vibration.

According to the invention, a cooling fan is provided on one side surface of the engine, a flywheel housing is provided on a side surface of the engine opposite to the cooling fan, the exhaust gas purifying device is long in a direction perpendicular to an output shaft of the engine, and the exhaust gas purifying device is disposed on the cylinder head at a position close to the flywheel housing. Therefore, the upper surfaces of the cylinder head, the exhaust manifold, and the intake manifold can be widely exposed. Thus, there is an effect that it is easy to carry out the maintenance operation of the engine.

Since the exhaust gas purifying device is disposed on the cylinder head at the position close to the flywheel housing as described above, the exhaust gas purifying device is separated away from the cooling fan of the engine. Therefore, there are advantages that the wind from the cooling fan is less likely to hit directly the exhaust gas purifying device, it is possible to suppress the reduction in a temperature of the exhaust gas purifying device and thus in a temperature of exhaust gas in the exhaust gas purifying device by the wind from the cooling fan, and the exhaust gas temperature can be maintained.

According to the invention, the exhaust manifold and an exhaust gas inlet tube connected to an exhaust gas inflow opening of the exhaust gas purifying device are detachably connected to each other through a relay exhaust tube. Therefore, there are effects that it is possible to dispose the exhaust gas purifying device close to the upper surface of the engine, avoiding a projecting part on the side of the upper surface of the engine 70 due to the existence of the relay exhaust tube, and to configure the engine 70 with the exhaust gas purifying device assembled compactly.

According to the invention, a portion of the exhaust gas purifying device at a position close to the intake manifold is detachably connected to the intake manifold through the filter support bodies. Therefore, the exhaust gas purifying device can be stably connected to the engine, avoiding the projecting part on the upper surface of the engine due to the existence of the relay exhaust tube. This is effective for preventing the exhaust gas purifying device from being damaged by vibration.

DESCRIPTION OF THE PREFERRED EMBODIMENTS

Figure 1:
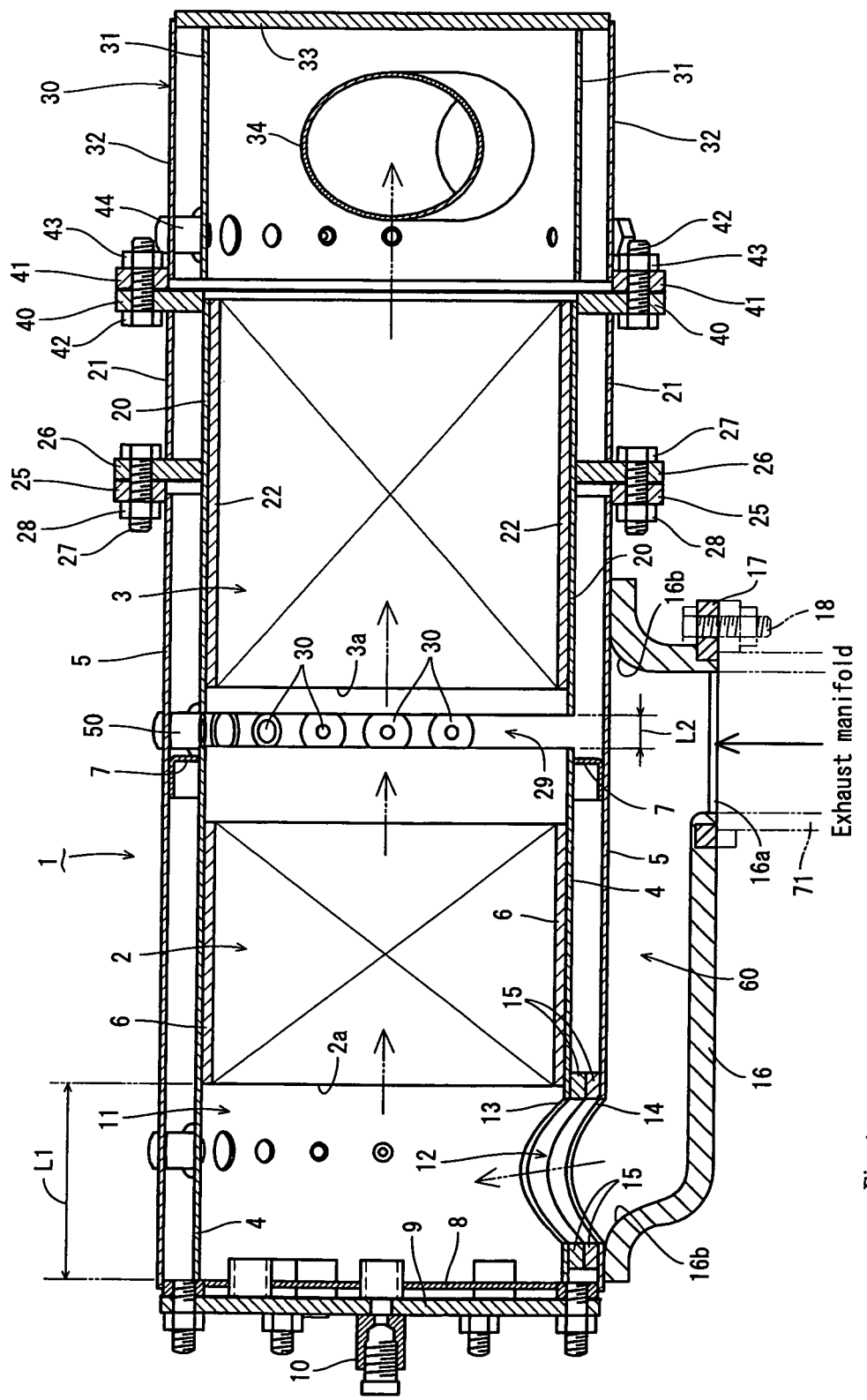
FIG. 1 is a front sectional view of an exhaust gas purifying device according to a first embodiment.
Figure 2:
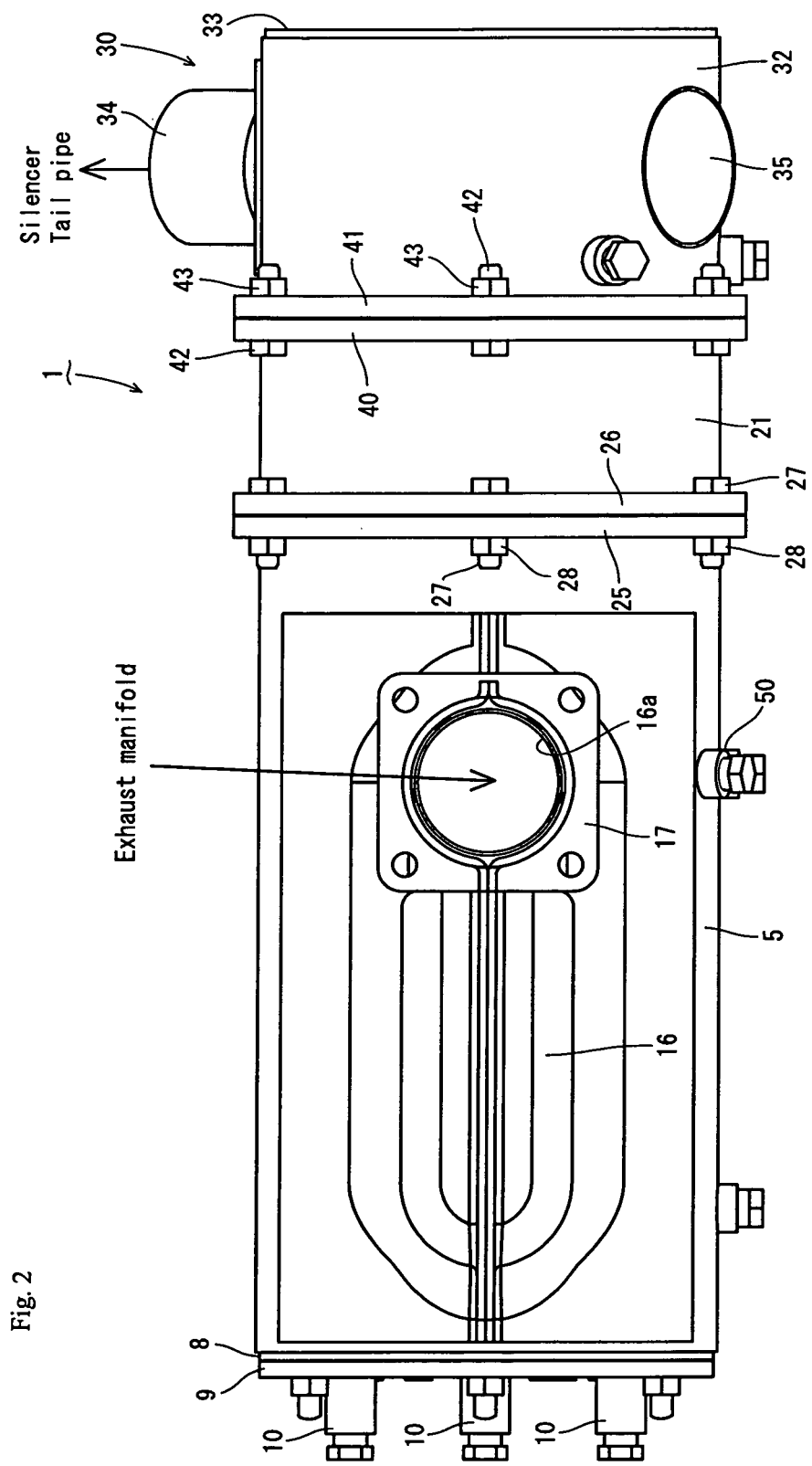
FIG. 2 is a bottom view of an exterior appearance thereof.
Figure 3:
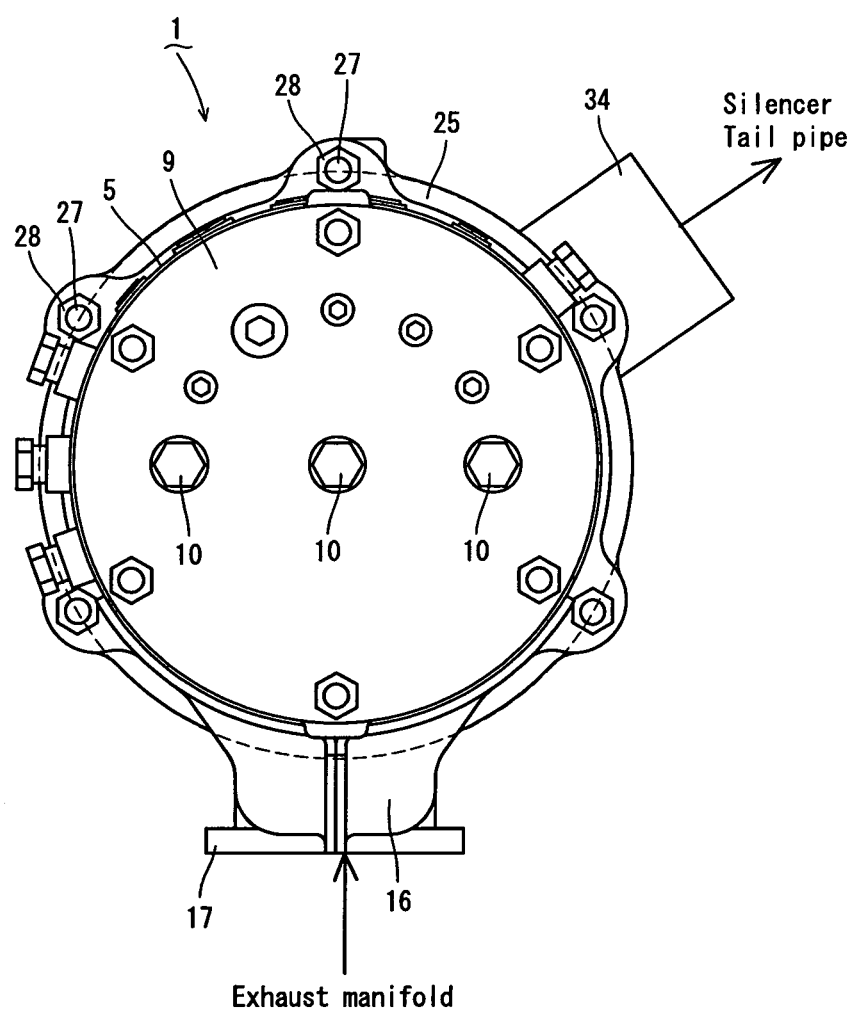
FIG. 3 is a left side view thereof as viewed from an inflow side of exhaust gas.
Figure 4:
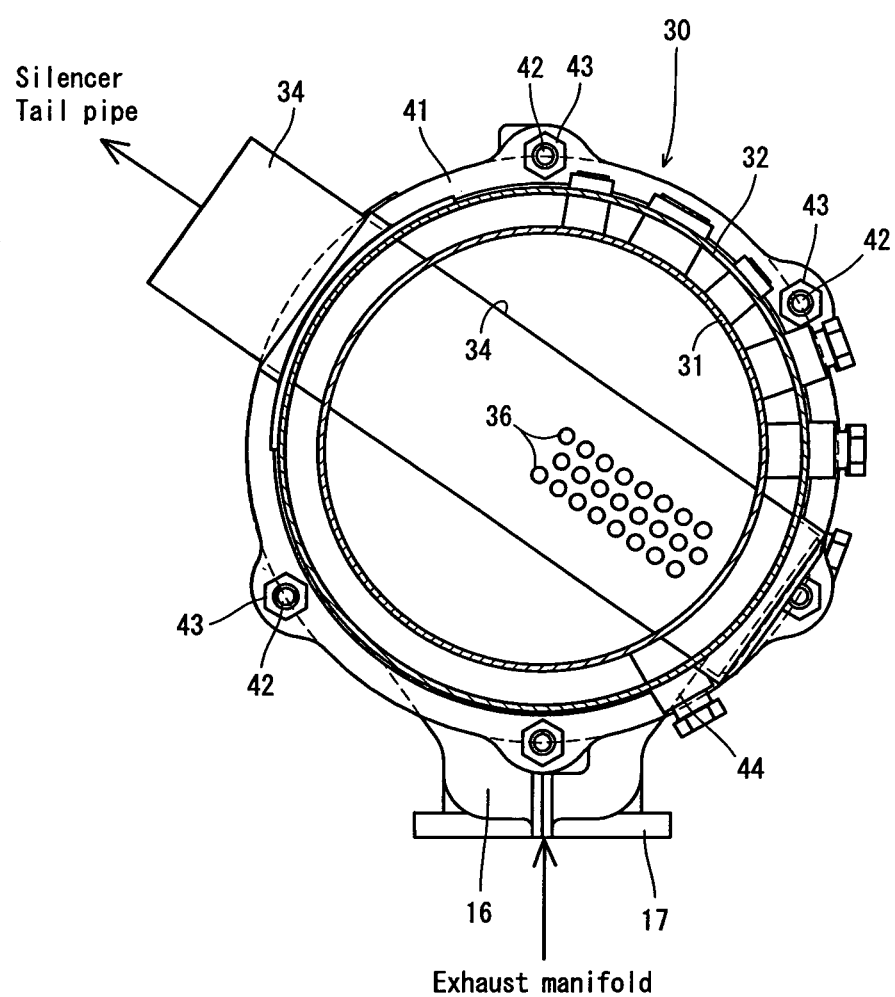
FIG. 4 is a right side view thereof as viewed from an exhaust gas discharge side.

Embodiments in which the present invention is put into effect will be described based on the drawings. In the following description, an exhaust gas inflow opening 12 in a diesel particulate filter 1 is a left side, and a side of a silencer 30 is a right side.

First, an entire structure of an exhaust gas purifying device in a first embodiment will be described with reference to FIGS. 1 to 5. As shown in FIGS. 1 to 5, a continuous regeneration type diesel particulate filter 1 (DPF, hereinafter) serving as an exhaust gas purifying device of the first embodiment is provided. The DPF 1 is for physically collecting particulate matter (PM) in exhaust gas. The DPF 1 has such a structure that a diesel oxidation catalyst 2 such as platinum for producing nitrogen dioxide ($NO_2$), and a soot filter 3 of honeycomb structure for continuously oxidizing and removing the collected particulate matter (PM) at a relatively low temperature are arranged in series in a moving direction of exhaust gas (from a left side to a right side in FIG. 1). The DPF 1 is configured such that the soot filter 3 is continuously regenerated. The DPF 1 can remove the particulate matter (PM) in exhaust gas and also reduce carbon monoxide (CO) and hydrocarbon (HC) in exhaust gas.

Figure 5:
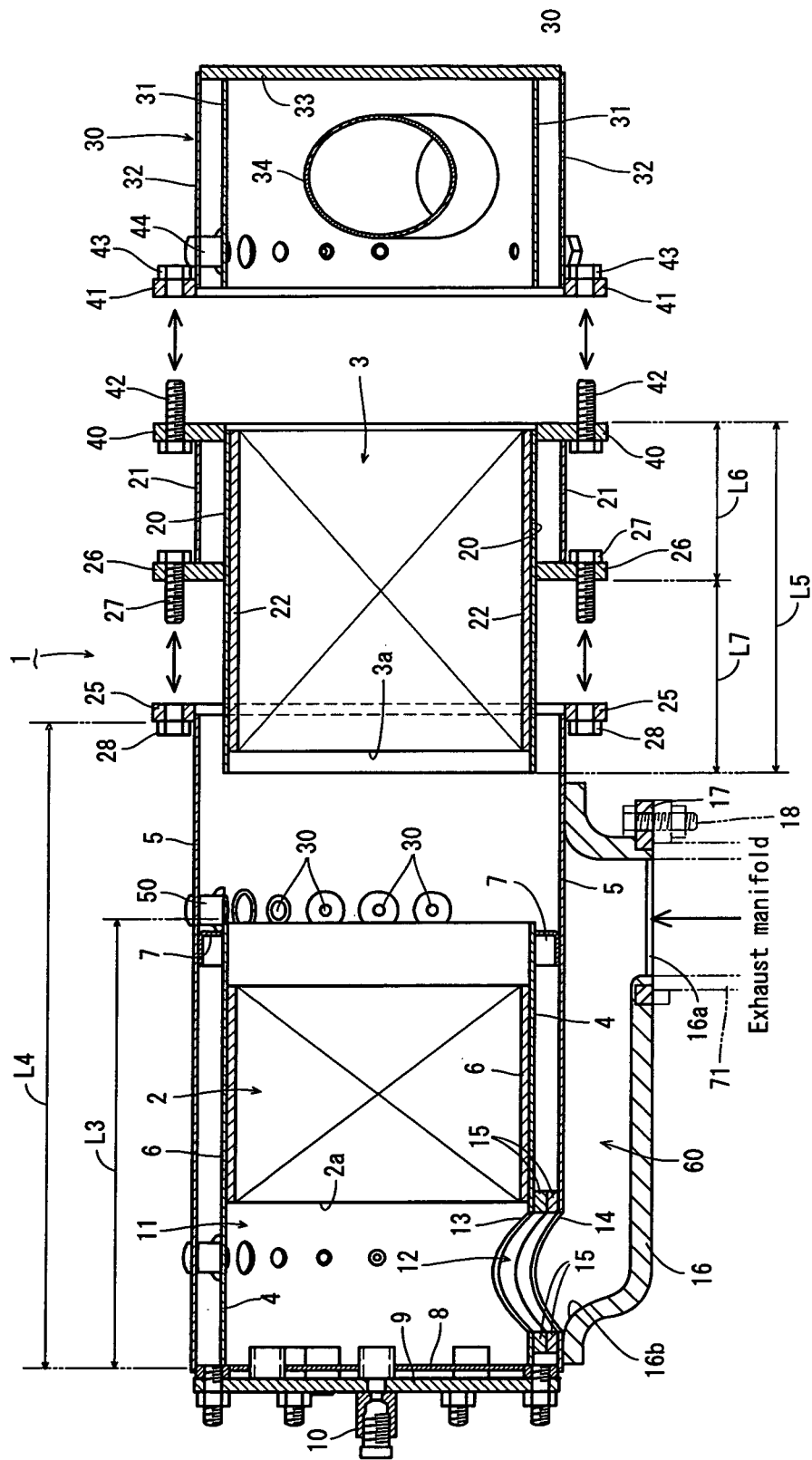
FIG. 5 is a front exploded sectional view of FIG. 1.

A mounting structure of the diesel oxidation catalyst 2 will be described with reference to FIGS. 1 and 5. As shown in FIGS. 1 and 5, the diesel oxidation catalyst 2 serving as an exhaust gas purifying filter which purifies exhaust gas discharged from an engine is provided in a substantially cylindrical catalyst inner case 4 made of heatproof metal. The catalyst inner case 4 is provided in a substantially cylindrical catalyst outer case 5 made of heatproof metal. That is, the catalyst inner case 4 is fitted over the diesel oxidation catalyst 2 through a mat-like catalyst heat insulator 6 made of ceramic fiber. The catalyst outer case 5 is fitted over the catalyst inner case 4 through a thin plate support body 7 having I-shaped end surface. The diesel oxidation catalyst 2 is protected by the catalyst heat insulator 6. A stress (deformation force) of the catalyst outer case 5 transmitted to the catalyst inner case 4 is reduced by the thin plate support body 7.

As shown in FIGS. 1 and 5, a disk-like left lid body 8 is fixed to left ends of the catalyst inner case 4 and the catalyst outer case 5 by welding. Sensor connecting plugs 10 are fixed to the left lid body 8 through a seat body 9. A left end surface 2a of the diesel oxidation catalyst 2 and the left lid body 8 are opposed to each other at a constant distance L1 for a gas inflow space. An exhaust gas inflow space 11 is formed between the left lid body 8 and the left end surface 2a of the diesel oxidation catalyst 2. An inlet-side exhaust gas pressure sensor and an inlet-side exhaust gas temperature sensor (both not shown) are connected to the sensor connecting plug 10.

Figure 9:
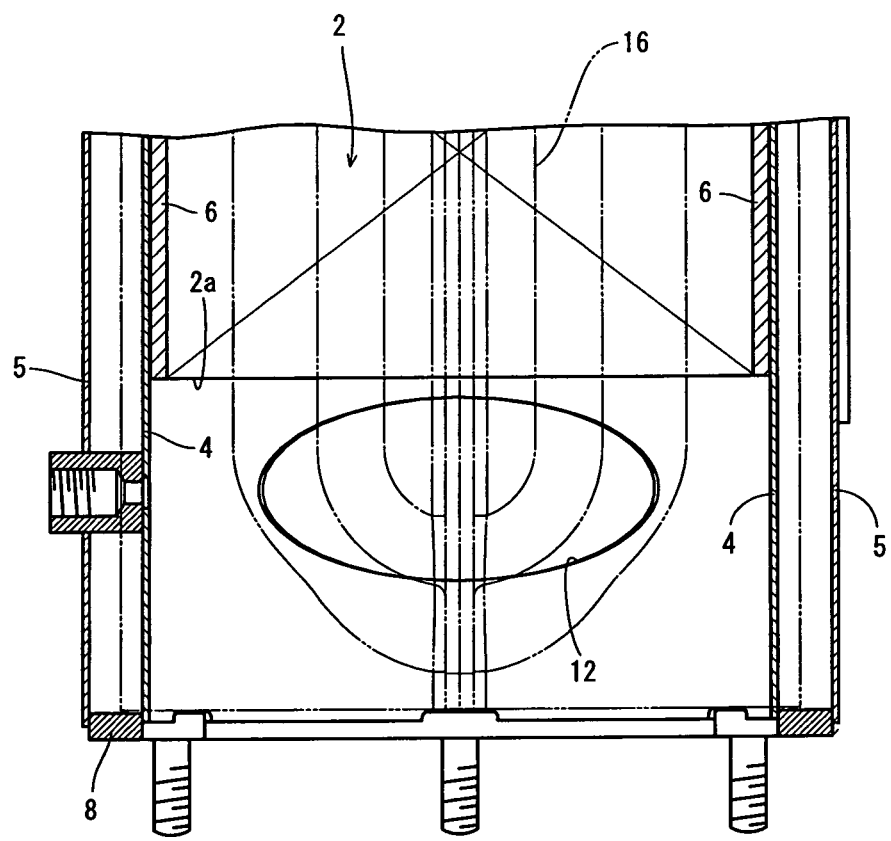
FIG. 9 is an enlarged plan sectional view thereof on the exhaust gas inflow side.

As shown in FIGS. 1, 5 and 9, an exhaust gas inflow opening 12 is formed in one ends of the catalyst inner case 4 and the catalyst outer case 5 in their longitudinal directions. The exhaust gas inflow opening 12 of the first embodiment is elliptic shaped and provided in left ends of the catalyst inner case 4 and the catalyst outer case 5. The elliptic exhaust gas inflow opening 12 has a shorter diameter in a moving direction of exhaust gas (direction of center lines of the cases 4 and 5), and has a longer diameter in a direction perpendicular to the moving direction of exhaust gas (circumference direction of the cases 4 and 5). A closing-ring body 15 is sandwiched and fixed between an opening edge 13 of the catalyst inner case 4 and an opening edge 14 of the catalyst outer case 5. A gap between the opening edge 13 of the catalyst inner case 4 and the opening edge 14 of the catalyst outer case 5 is closed with a closing-ring body 15. The closing-ring body 15 prevents exhaust gas from flowing in between the catalyst inner case 4 and the catalyst outer case 5.

As shown in FIGS. 1, 3, 5 and 8, the exhaust gas inlet tube 16 is disposed on an outer surface of the catalyst outer case 5 in which the exhaust gas inflow opening 12 is formed. The exhaust gas inlet tube 16 is formed into a half-cylindrical shape which opens upward, a rectangular opening end 16b which has a large diameter and is oriented upward covers the exhaust gas inflow opening 12, and is welded and fixed to the outer surface of the catalyst outer case 5 such as to extend in a longitudinal (lateral) direction of the catalyst outer case 5. Therefore, the upwardly-oriented opening end 16b of the exhaust gas inlet tube 16 which is on an exhaust gas outlet side is communicated with and connected to the exhaust gas inflow opening 12 of the catalyst outer case 5.

A perfect circle downwardly-oriented opening end 16a having a small diameter opens, as an exhaust gas inlet side, at a right end of the exhaust gas inlet tube 16 at a position corresponding to an intermediate portion of the catalyst outer case 5 in its longitudinal direction. An exhaust connecting flange body 17 is welded and fixed to an outer periphery of the downwardly-oriented opening end 16a. The exhaust connecting flange body 17 is detachably fastened to an exhaust manifold 71 of a later-described diesel engine 70 through bolts 18.

In this case, a positional relation of an insertion holes of the exhaust connecting flange body 17 and the exhaust manifold 71 is set so that the exhaust connecting flange body 17 can be fastened to the exhaust manifold 71 through the bolts 18 even when a lateral mounting orientation of the DPF 1 is reversed (laterally reversed) (not shown). That is, the downwardly-oriented opening end 16a of the exhaust gas inlet tube 16 is connected to the exhaust manifold 71 such that the mounting orientation can be changed.

The downwardly-oriented opening end 16a of the exhaust gas inlet tube 16 in the first embodiment is located substantially at a central portion of the DPF 1 (outer cases 5, 21, 32) in the longitudinal direction (lateral direction). Therefore, a length of the DPF 1 in the moving direction of exhaust gas is such a value that this length is substantially equally divided into two at a position of the downwardly-oriented opening end 16a of the exhaust gas inlet tube 16.

Figure 8:
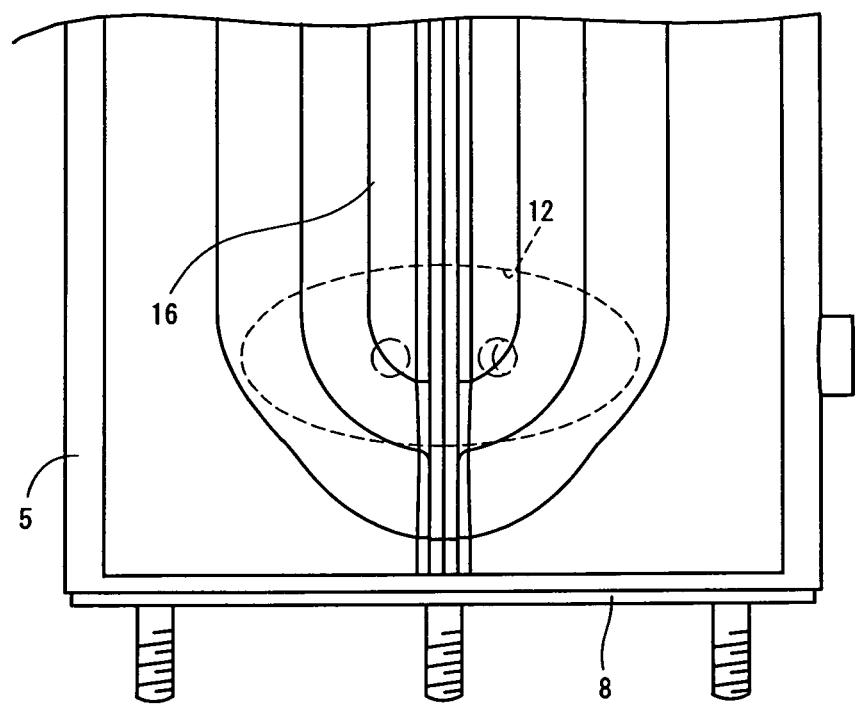
FIG. 8 is an enlarged bottom view thereof on an exhaust gas inflow side.

As shown in FIGS. 1, 5 and 8, a left end of the exhaust gas inlet tube 16 covers the exhaust gas inflow opening 12 of the catalyst outer case 5, and the downwardly-oriented opening end 16a as an inlet side of exhaust gas is formed in a right end of the exhaust gas inlet tube 16. That is, the downwardly-oriented opening end 16a of the exhaust gas inlet tube 16 is provided being offset (deviated in position) toward the downstream (right side of the catalyst outer case 5) in the moving direction of exhaust gas, with respect to the elliptic exhaust gas inflow opening 12.

The upwardly-oriented opening end 16b of the exhaust gas inlet tube 16 is welded and fixed to the outer surface of the catalyst outer case 5 so as to cover the exhaust gas inflow opening 12 and extend in the longitudinal (lateral) direction of the catalyst outer case 5. Therefore, an introducing passage 60 for exhaust gas is formed by the outer surface of the catalyst outer case 5 and an inner surface of the exhaust gas inlet tube 16.

According to the above-described configuration, exhaust gas from the engine 70 enters the exhaust gas inlet tube 16 from the exhaust manifold 71, enters the exhaust gas inflow space 11 from the exhaust gas inlet tube 16 through the exhaust gas inflow opening 12, and is supplied to the diesel oxidation catalyst 2 from the left end surface 2a. Nitrogen dioxide (NO2) is generated by oxidation action of the diesel oxidation catalyst 2. When the DPF 1 is mounted in the engine 70, the catalyst outer case 5 is fixed to a cylinder head 72 of the engine 70 through supporting legs 19a to 19c. Details thereof will be described later.

A mounting structure of the soot filter 3 will be described with reference to FIGS. 1 and 5. As shown in FIGS. 1 and 5, the soot filter 3 serving as the gas purifying filter which purifies exhaust gas discharged from the engine 70 is provided in a substantially cylindrical filter inner case 20 made of heatproof metal. The inner case 4 is provided in a substantially cylindrical filter outer case 21 made of heatproof metal. That is, the filter inner case 20 is fitted over the soot filter 3 through a mat-like filter heat insulator 22 made of ceramic fiber. The soot filter 3 is protected by the filter heat insulator 22.

As shown in FIGS. 1 and 5, a catalyst-side flange 25 is welded to an end of the catalyst outer case 5 on the downstream side (right side) in the moving direction of exhaust gas. A filter-side flange 26 is welded to an intermediate portion of the filter inner case 20 in the moving direction of exhaust gas and to an end of the filter outer case 21 on the upstream side (left side) in the moving direction of exhaust gas. The catalyst-side flange 25 and the filter-side flange 26 are detachably fastened to each other through bolts 27 and nuts 28. A diameter size of the cylindrical catalyst inner case 4 and a diameter size of the cylindrical filter inner case 20 are substantially the same. A diameter size of the catalyst outer case 5 and a diameter size of the cylindrical filter outer case 21 are substantially the same.

As shown in FIG. 1, in a state where the filter outer case 21 is connected to the catalyst outer case 5 through the catalyst-side flange 25 and the filter-side flange 26, an end of the filter inner case 20 on the upstream side (left side) in the moving direction of exhaust gas is opposed to an end of the catalyst inner case 4 on the downstream side (right side) in the moving direction of exhaust gas at a constant distance L2 for mounting sensor. That is, a sensor-mounting space 29 is formed between the end of the catalyst inner case 4 on the downstream side (right side in the moving direction of exhaust gas and the end of the filter inner case 20 on the upstream side (left side) in the moving direction of exhaust gas. A sensor connecting plug 50 is fixed to the catalyst outer case 5 at a position corresponding to the sensor-mounting space 29. A filter inlet-side exhaust gas pressure sensor and a filter inlet-side exhaust gas temperature sensor (thermistor) are connected to the sensor connecting plug 50.

As shown in FIG. 5, a cylinder length L4 of the catalyst outer case 5 in the moving direction of exhaust gas is longer than a cylinder length L3 of the catalyst inner case 4 in the moving direction of exhaust gas. A cylinder length L6 of the filter outer case 21 in the moving direction of exhaust gas is shorter than a cylinder length L5 of the filter inner case 20 in the moving direction of exhaust gas. A length (L2+L3+L5) which is a sum of a constant distance L2 of the sensor-mounting space 29, the cylinder length L3 of the catalyst inner case 4, and the cylinder length L5 of the filter inner case 20 is substantially equal to a length (L4+L6) which is a sum of the cylinder length L4 of the catalyst outer case 5 and the cylinder length L6 of the filter outer case 21. An end of the filter inner case 20 on the upstream side (left side) in the moving direction of exhaust gas projects from an end of the filter outer case 21 on the upstream side (left side) in the moving direction of exhaust gas by a difference (L7=L5−L6) of the lengths thereof. That is, when the filter outer case 21 is connected to the catalyst outer case 5, the end of the filter inner case 20 on the upstream side (left side) in the moving direction of exhaust gas is inserted into the catalyst outer case 5 on the downstream side (right side) in the moving direction of exhaust gas by the overlap size L7.

According to the above-described configuration, nitrogen dioxide ($NO_2$) generated by oxidation action of the diesel oxidation catalyst 2 is supplied from the left end surface 3a to the soot filter 3. Collected particulate matter (PM) in exhaust gas of the diesel engine 70 collected by the soot filter 3 is continuously oxidized and removed by nitrogen dioxide ($NO_2$) at a relatively low temperature. The particulate matter (PM) in the exhaust gas of the diesel engine 70 is removed, and carbon monoxide (CO) and hydrocarbon (HC) in the exhaust gas of the diesel engine 70 are reduced.

As shown in FIGS. 1 to 5, the exhaust gas purifying device includes the diesel oxidation catalyst 2 and the soot filter 3 serving as gas purifying filters which purify exhaust gas discharged from the diesel engine 70, the catalyst inner case 4 and the filter inner case 20 in which the diesel oxidation catalyst 2 and the soot filter 3 are provided, and the catalyst outer case 5 and the filter outer case 21 in which the catalyst inner case 4 and the filter inner case 20 are provided. The exhaust gas purifying device includes a plurality sets of diesel oxidation catalyst 2 and soot filter 3, catalyst inner case 4, and filter inner case 20, catalyst outer case 5 and filter outer case 21. The catalyst-side flange 25 and the filter-side flange 26 as flange bodies which connect the catalyst outer case 5 and the filter outer case 21 to each other are offset from a connecting boundary position between the diesel oxidation catalyst 2 and the soot filter 3. Therefore, a distance of the joint portion between the diesel oxidation catalyst 2 and the soot filter 3 can be shortened, and a connection length between the catalyst outer case 5 and the filter outer case 21 can be shortened.

A gas sensor can easily be disposed at the connecting boundary position between the diesel oxidation catalyst 2 and the soot filter 3. Since lengths of the catalyst outer case 5 and the filter outer case 21 in the moving direction of exhaust gas can be shortened, rigidity of the catalyst outer case 5 and the filter outer case 21 can be enhanced, and weights thereof can be reduced.

As shown in FIGS. 1 to 5, the two kinds of diesel oxidation catalyst 2 and soot filter 3 are provided. The catalyst outer case 5 in which the catalyst inner case 4 of the diesel oxidation catalyst 2 on one side is provided overlaps the filter inner case 20 in which the soot filter 3 on the other side is provided. Therefore, lengths of the diesel oxidation catalyst 2 and the soot filter 3 in the moving direction of exhaust gas are secured, while lengths of the catalyst outer case 5 and the filter outer case 21 in the moving direction of exhaust gas can be shortened.

The catalyst outer case 5 overlaps the catalyst inner case 4 (diesel oxidation catalyst 2 on the other side). The catalyst inner case 4 is largely exposed outside by separation (disassemble) of the catalyst outer case 5 and the filter outer case 21. Therefore, the exposure range of the catalyst inner case 4 (other diesel oxidation catalyst 2) is increased, and a maintenance operation such as a removing operation of soot of the soot filter 3 can be facilitated.

As shown in FIGS. 1 to 5, the diesel oxidation catalyst 2 and the soot filter 3 are provided as a plurality sets of gas purifying filters, and the catalyst-side flange 25 and the filter-side flange 26 offset with respect to the outer periphery of the soot filter 3. Therefore, the end of the exhaust gas inlet-side inner case 20 of the soot filter 5 can be largely exposed from an end surface of the outer case 21, the maintenance operation such as removing operation of soot attached to the soot filter 3 and the inner case 20 can be facilitated.

As shown in FIGS. 1 to 5, the two kinds of diesel oxidation catalyst 2 and soot filter 3 are provided, and the sensor-mounting space 29 is formed between the catalyst inner case 4 in which the diesel oxidation catalyst 2 on one side is provided and the filter inner case 20 in which the soot filter 3 on the other side is provided. Therefore, a connection length of the catalyst outer case 5 and the filter outer case 21 in the moving direction of exhaust gas can be shortened, rigidity of the catalyst outer case 5 and the filter outer case 21 can be enhanced, weights thereof can be reduced, and a gas sensor can be easily disposed in the sensor-mounting space 29 at the connecting boundary position between the diesel oxidation catalyst 2 and the soot filter 3.

As shown in FIGS. 1 to 5, the sensor connecting plug 50 as a sensor supporting body is assembled into the catalyst outer case 5 which overlaps the filter inner case 20, and a gas sensor such as the filter inlet-side exhaust gas pressure sensor and the filter inlet-side exhaust gas temperature sensor (thermistor) (both not shown) is disposed at the connecting boundary position between the diesel oxidation catalyst 2 and the soot filter 3 through the sensor connecting plug 50. Therefore, rigidity of the catalyst outer case 5 and the filter outer case 21 can be enhanced, weights thereof can be reduced, and the sensor connecting plug 50 can be compactly disposed at the connecting boundary position between the diesel oxidation catalyst 2 and the soot filter 3.

The diesel oxidation catalyst 2 and the soot filter 3 are provided as the gas purifying filters which purify exhaust gas discharged from the engine, but instead of the diesel oxidation catalyst 2 and the soot filter 3, it is possible to provide NOx-selective reducing catalyst (NOx-removing catalyst) which reduces nitrogen oxide (NOx) in exhaust gas of the engine 70 by ammonia (NH3) generated by adding urea (reducing agent), and ammonia-removing catalyst which removes residual ammonia discharged from NOx-selective reducing catalyst.

When the catalyst inner case 4 is provided with the NOx-selective reducing catalyst (NOx-removing catalyst) serving as the gas purifying filter and the filter inner case 20 is provided with ammonia-removing catalyst as described above, the nitrogen oxide (NOx) in exhaust gas discharged from the engine can be reduced, and it is discharged as harmless nitrogen oxide (NOx).

As shown in FIGS. 1 to 5, the exhaust gas purifying device includes the diesel oxidation catalyst 2 and the soot filter 3 serving as gas purifying filters which purify exhaust gas discharged from the diesel engine 70, the catalyst inner case 4 and the filter inner case 20 in which the diesel oxidation catalyst 2 and the soot filter 3 are provided, and the catalyst outer case 5 and the filter outer case 21 in which the catalyst inner case 4 and the filter inner case 20 are provided. In the exhaust gas purifying device, the catalyst inner case 4 and the filter inner case 20 are connected to the catalyst outer case 5 and the filter outer case 21, and the exhaust gas inlet tube 16 as an inlet constituent part to which an external stress is applied is disposed on the catalyst outer case 5.

Therefore, the external stress can be supported by the catalyst outer case 5, and it is possible to reduce external stresses applied, as deformation forces, to the catalyst inner case 4 and the filter inner case 20. By the double structure of the catalyst inner case 4 and the filter inner case 20 as well as the catalyst outer case 5 and the filter outer case 21, thermal insulation of the diesel oxidation catalyst 2 and the soot filter 3 is enhanced, the processing ability and the generating ability of the diesel oxidation catalyst 2 and the soot filter 3 can be enhanced, and it is possible to easily avoid a case where the supporting performance of the diesel oxidation catalyst 2 and the soot filter 3 is deteriorated by transmission of vibration from the engine and by distortion of welding operation.

As shown in FIGS. 1 to 5, the engine device includes the plurality sets of diesel oxidation catalyst 2 and soot filter 3, catalyst inner case 4 and filter inner case 20, and catalyst outer case 5 and filter outer case 21, and the plurality sets of catalyst outer case 5 and the filter outer case 21 are connected to each other by means of the catalyst-side flange 25 and the filter-side flange 26 as flange bodies. Therefore, the plurality sets of catalyst inner case 4 and filter inner case 20, and the plurality sets of catalyst outer case 5 and filter outer case 21 can be configured functionally while taking into account the configuration of the exhaust gas inlet tube 16 and movement of exhaust gas between the plurality sets of diesel oxidation catalyst 2 and soot filter 3. The processing ability and the generating ability of the plurality sets of diesel oxidation catalyst 2 and soot filter 3 can be easily enhanced.

As shown in FIGS. 1 to 5, lengths of the catalyst inner case 4 and the filter inner case 20 in the moving direction of exhaust gas is different from lengths of the catalyst outer case 5 and the filter outer case 21 in the moving direction of exhaust gas. Therefore, the flange body which connects the catalyst outer case 5 and the filter outer case 21 with each other can be offset with respect to a joint position between the plurality sets of diesel oxidation catalyst 2 and soot filter 3. The mounting distance between the plurality sets of diesel oxidation catalyst 2 and soot filter 3 can be easily reduced or increased.

As shown in FIGS. 1 to 5, the engine device includes the plurality sets of diesel oxidation catalyst 2 and soot filter 3, the catalyst inner case 4 and the filter inner case 20, and the catalyst outer case 5 and the filter outer case 21, the catalyst-side flange 25 and the filter-side flange 26 which connect the plurality sets of catalyst outer case 5 and filter outer case 21 with each other are offset with respect to the coupling position between the plurality sets of diesel oxidation catalyst 2 and soot filter 3, and the catalyst outer case 5 which is opposed to the diesel oxidation catalyst 2 on one side overlaps the filter inner case 20 which is opposed to the soot filter 3 on the other side.

Therefore, a joint distance between the plurality sets of diesel oxidation catalyst 2 and soot filter 3 can be reduced, and a sensor can be easily disposed in a jointing space between the plurality sets of diesel oxidation catalyst 2 and soot filter 3. Lengths of the plurality sets of catalyst outer case 5 and filter outer case 21 in the moving direction of exhaust gas can be shortened, rigidity of the plurality sets of catalyst outer case 5 and filter outer case 21 can be enhanced, and weights thereof can be reduced. A joint distance between the plurality sets of diesel oxidation catalyst 2 and soot filter 3 can be shortened, and lengths of the plurality sets of catalyst outer case 5 and filter outer case 21 in the moving direction of exhaust gas can be reduced.

A mounting structure of a silencer 30 will be described with reference to FIGS. 1 to 3, and 5 to 7. As shown in FIGS. 1 to 3 and 5, the silencer 30 which reduces sound of exhaust gas discharged from the diesel engine 70 includes a substantially cylindrical silencing inner case 31 made of heatproof metal, a substantially cylindrical silencing outer case 32 made of heatproof metal, and a disk-shaped right lid body 33 fixed to right ends of the silencing inner case 31 and the silencing outer case 32 by welding. The silencing inner case 31 is provided in the silencing outer case 32. The diameter size of the cylindrical catalyst inner case 4, the diameter size of the cylindrical filter inner case 20, and the diameter size of the cylindrical silencing inner case 31 are substantially the same. The diameter size of the cylindrical catalyst outer case 5, the diameter size of the cylindrical filter outer case 21, and the diameter size of the cylindrical silencing outer case 32 are substantially the same.

As shown in FIGS. 4 to 7, an exhaust gas outlet tube 34 penetrates the silencing inner case 31 and the silencing outer case 32. One end of the exhaust gas outlet tube 34 is closed with an outlet lid body 35. A large number of exhaust holes 36 are formed in an entire exhaust gas outlet tube 34 in the silencing inner case 31. An interior of the silencing inner case 31 is communicated with the exhaust gas outlet tube 34 though the large number of exhaust holes 36. A silencer and a tail pipe (both not shown) are connected to the other end of the exhaust gas outlet tube 34.

Figure 6:
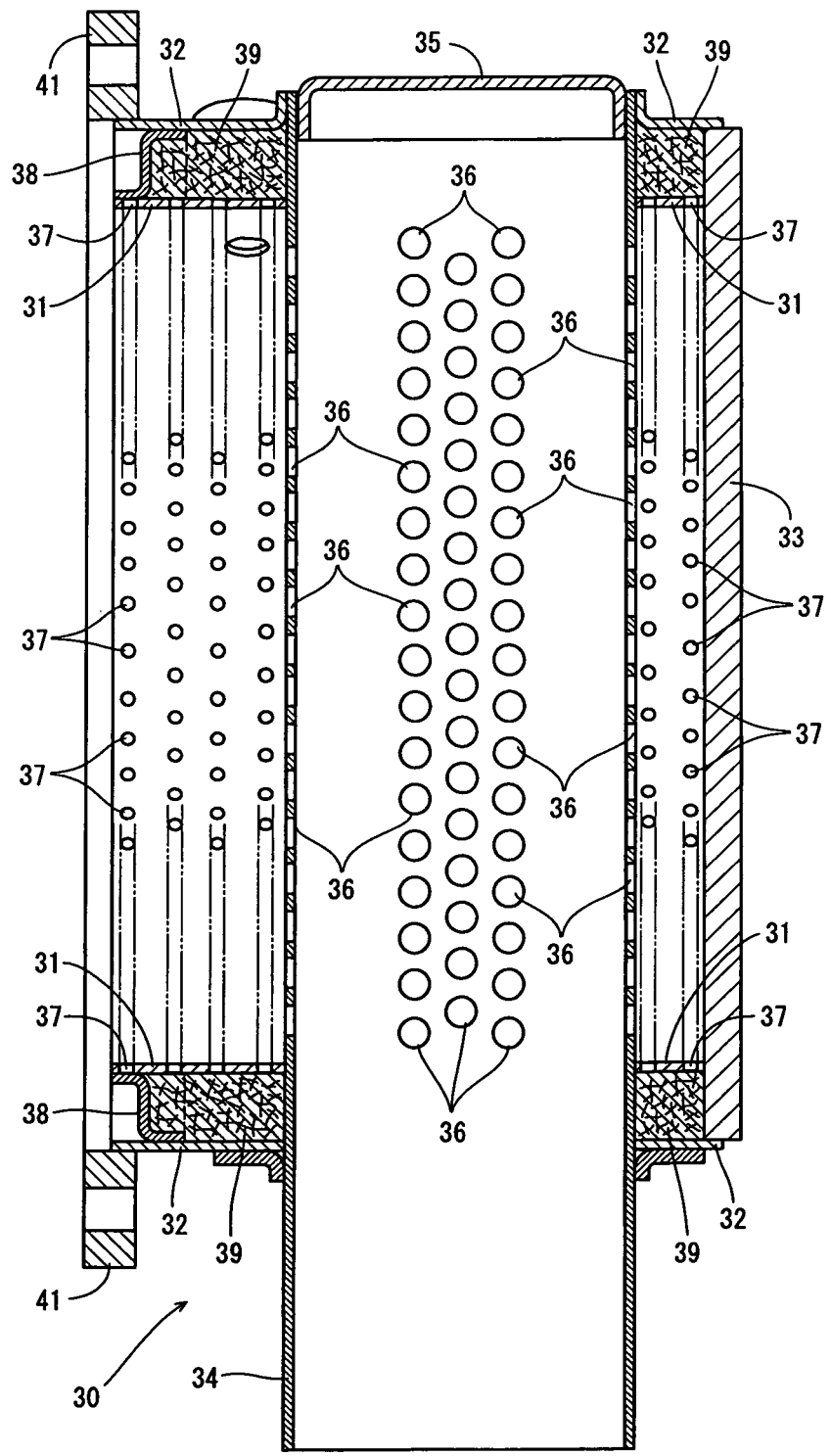
FIG. 6 is an enlarged front sectional view thereof on the exhaust gas discharge side.
Figure 7:
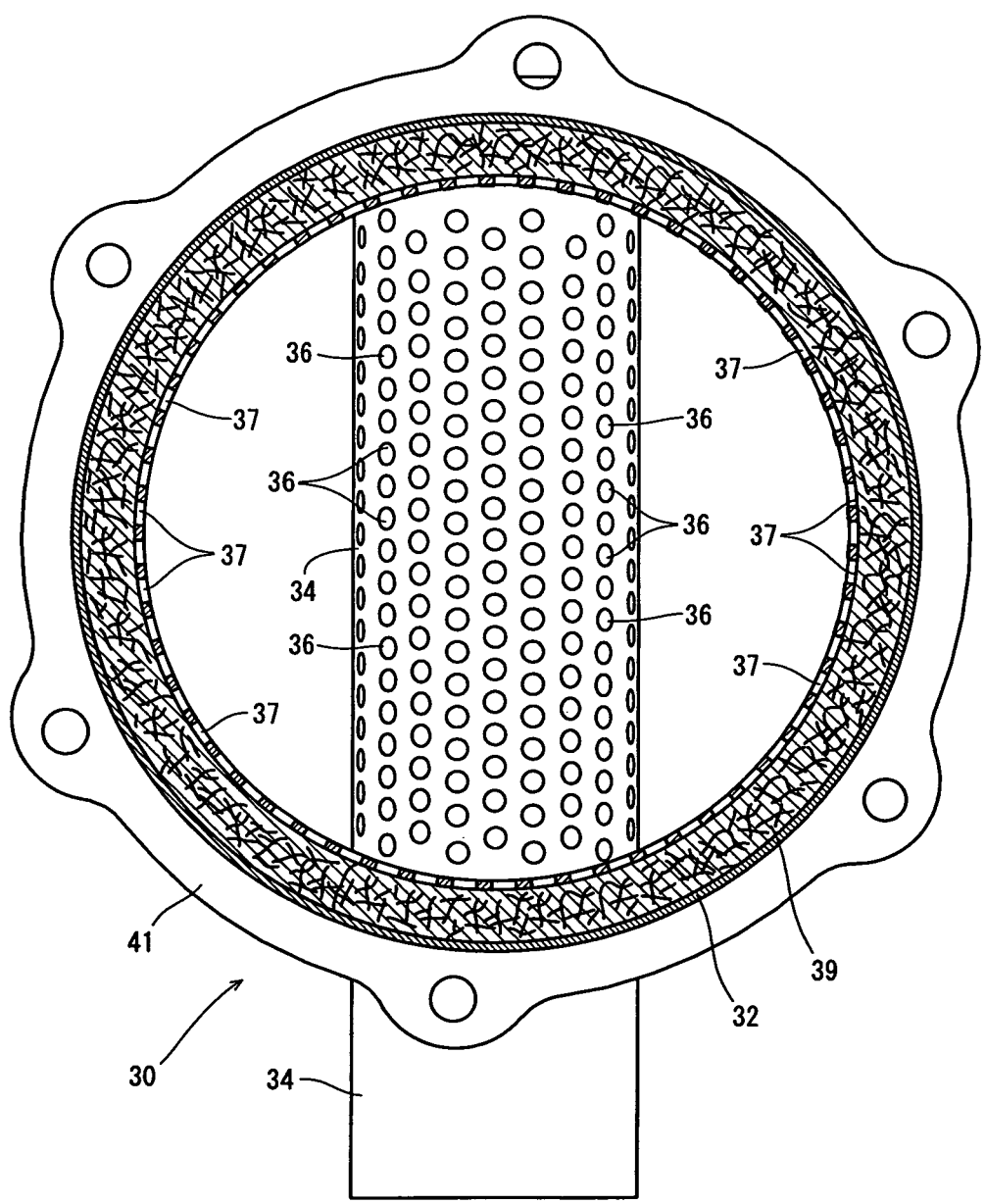
FIG. 7 is an enlarged side sectional view thereof on the exhaust gas discharge side.

As shown in FIGS. 6 and 7, a large number of silencing holes 37 are formed in the silencing inner case 31. An interior of the silencing inner case 31 is communicated with the silencing inner case 31 and the silencing outer case 32 through the large number of silencing holes 37. A space between the silencing inner case 31 and the silencing outer case 32 is closed with the right lid body 33 and a thin plate support body 38. A ceramic fiber silencing material 39 is filled between the silencing inner case 31 and the silencing outer case 32. An end of the silencing inner case 31 on the upstream side (left side) in the moving direction of exhaust gas is connected to an end of the silencing outer case 32 on the upstream side (left side) in the moving direction of exhaust gas through the thin plate support body 38.

According to the configuration described above, exhaust gas is discharged from the silencing inner case 31 through the exhaust gas outlet tube 34. In the silencing inner case 31, sound of exhaust gas (mainly sound of high frequency band) is silenced by the silencing material 39 through the large number of silencing holes 37. Noise of exhaust gas discharged from the outlet side of the exhaust gas outlet tube 34 is reduced.

As shown in FIGS. 1 and 5, a filter-side outlet flange 40 is welded to ends of a filter inner case 20 and a filter outer case 21 on the downstream side (right side) in the moving direction of exhaust gas. A silencing-side flange 41 is welded to an end of the silencing outer case 32 on the upstream side (left side) in the moving direction of exhaust gas. The filter-side outlet flange 40 and the silencing-side flange 41 are detachably fastened to each other through bolts 42 and nuts 43. A sensor connecting plug 44 is fixed to the filter inner case 20 and the filter outer case 21. An outlet-side exhaust gas pressure sensor and an outlet-side exhaust gas temperature sensor (thermistor) (both not shown) are connected to the sensor connecting plug 44.

As shown in FIGS. 1, 2, and 5 to 7, the exhaust gas purifying device includes the diesel oxidation catalyst 2 or the soot filter 3 serving as the gas purifying filter which purifies exhaust gas discharged from the diesel engine 70, the catalyst inner case 4 or the filter inner case 20 serving as the inner case in which the diesel oxidation catalyst 2 or the soot filter 3 is provided, and the catalyst outer case 5 or the filter outer case 21 serving as the outer case in which the catalyst inner case 4 or the filter inner case 20 is provided. The exhaust gas purifying device also includes the silencing material 39 serving as an exhaust sound reducing body which reduces exhaust sound of exhaust gas discharged from the diesel engine 70, and the silencing material 39 is disposed on the exhaust gas outlet-side end of the catalyst outer case 5 or the filter outer case 21. The exhaust gas purifying function of the diesel oxidation catalyst 2 or the soot filter 3 is maintained, and the exhaust gas silencing function can be easily added without changing a structure of the diesel oxidation catalyst 2 or the soot filter 3. For example, it is possible to easily configure an exhausting structure in which a tail pipe is connected directly to the outer case, and an exhausting structure in which the silencing function of an existing silencer is enhanced.

It was difficult to take high frequency reducing countermeasures of exhaust gas at a position of the diesel oxidation catalyst 2 or the soot filter 3, but the high frequency reducing countermeasures can be easily carried out. For example, a silencing structure (silencing material 39) formed from a punch hole and a fiber mat can be easily installed.

As shown in FIGS. 5 to 7, the engine device includes the silencer 30 having the silencing material 39, and the silencer 30 is detachably connected to the exhaust gas outlet-side end of the filter outer case 21. Therefore, the silencing function of exhaust gas at a position of the diesel oxidation catalyst 2 or the soot filter 3 can easily be changed by attaching and detaching the silencer 30.

As shown in FIGS. 5 to 7, the engine device includes the silencer 30 having the silencing material 39, the catalyst outer case 5 or the filter outer case 21 and the silencer 30 are formed into cylindrical shapes having substantially equal outer diameter sizes, the filter-side outlet flange 40 serving as a ring-shaped flange body is provided on the exhaust gas outlet-side end of the filter outer case 21, and the silencing material 39 is detachably connected to the exhaust gas outlet-side end of the filter outer case 21 through the filter-side outlet flange 40. Therefore, by connecting the silencer 30 having substantially equal outer diameter size to the filter outer case 21 by means of the filter-side outlet flange 40, and by increasing the mounting size of the catalyst outer case 5 or the filter outer case 21 in the moving direction of exhaust gas, the silencer 30 can be compactly assembled. For example, the catalyst outer case 5 or the filter outer case 21 can be easily installed so as to be close to a side surface of the exhaust gas discharging portion of the diesel engine 70.

It is possible to enhance the gas purifying function of the diesel oxidation catalyst 2 or the soot filter 3 by maintaining the temperature of exhaust gas, and to easily take the high frequency reducing countermeasures by installing the silencing material 39.

As shown in FIGS. 5 to 7, the engine device includes the silencing inner case 31 and the silencing outer case 32 serving as silencer casings in which the silencing material 39 is provided, and the exhaust gas outlet tube 34 having a closed one end and the other end in communication with the tail pipe (not shown), a forming portion of the exhaust holes 36 of the exhaust gas outlet tube 34 penetrating the silencing inner case 31, and the silencing outer case 32, and the silencing inner case 31 and the silencing outer case 32 are detachably connected to the exhaust gas outlet-side end of the filter outer case 21 through the filter-side outlet flange 40. Therefore, the silencing function of exhaust gas at a position of the diesel oxidation catalyst 2 or the soot filter 3 can be easily changed by attaching and detaching the silencing inner case 31 and the silencing outer case 32. For example, it is possible to easily configure the exhausting structure in which the silencing function of exhaust gas is further enhanced by installing another silencer (not shown) which is different from the silencing inner case 31 and the silencing outer case 32.

It is possible to easily configure the exhausting structure in which the tail pipe (not shown) is connected directly to the filter outer case 21 by disposing the silencing inner case 31 and the silencing outer case 32 in which the silencing material 39 is not provided. As for the high frequency reducing countermeasures of exhaust gas which were difficult to be taken at a position of the diesel oxidation catalyst 2 or the soot filter 3, it is possible to easily configure a silencing structure with the silencing material 39 (punch hole and fiber mat) in the silencing inner case 31 and the silencing outer case 32.

As shown in FIGS. 5 to 7, the silencer casing includes the cylindrical silencing inner case 31 and the cylindrical silencing outer case 32, the silencing inner case 31 is disposed in the silencing outer case 32, the silencing material 39 is filled in between the silencing inner case 31 and the silencing outer case 32, and the large number of silencing holes 37 are formed in the silencing inner case 31. Therefore, it is possible to configure the silencer casing (silencing inner case 31 and the silencing outer case 32) such that the silencer casing is closely analogous to the exhaust gas purifying structure including the catalyst inner case 4 or the filter inner case 20 in which the diesel oxidation catalyst 2 or the soot filter 3 is provided, and the catalyst outer case 5 or the filter outer case 21.

It is possible to form the silencing inner case 31 or the silencing outer case 32 of the silencer casing by utilizing the same material (pipe) as that of the catalyst inner case 4 or the filter inner case 20 in which the diesel oxidation catalyst 2 or the soot filter 3 is provided, and the catalyst outer case 5 or the filter outer case 21. It is possible to easily reduce the producing cost of the silencer casing.

Figure 10:
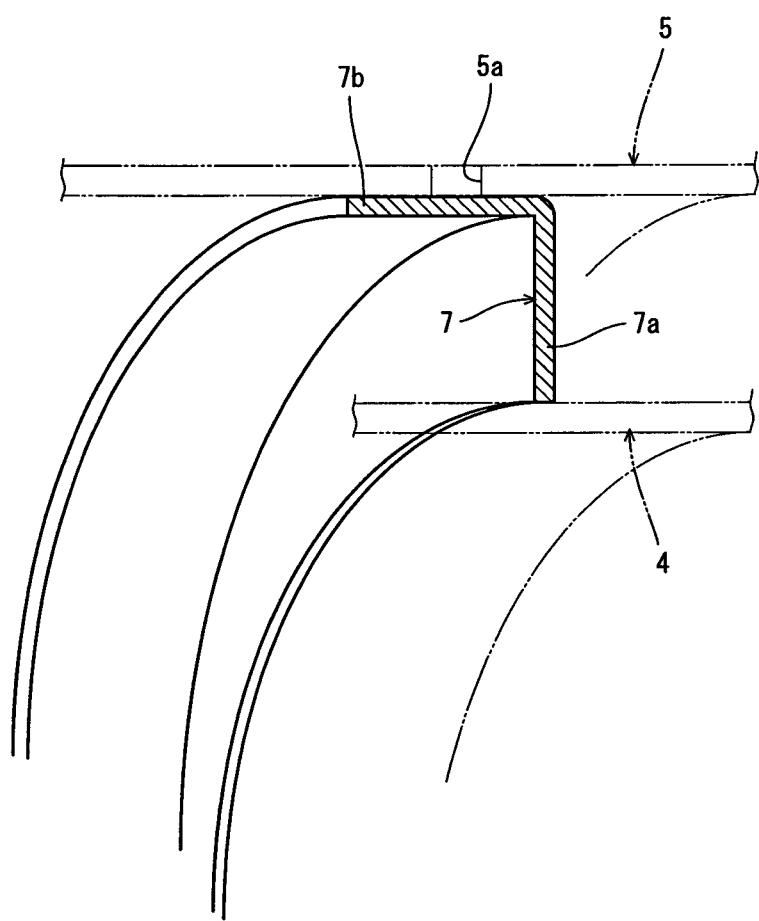
FIG. 10 is an enlarged sectional view of an inner case support body.

A structure of the inner case support body 7 will be described with reference to FIGS. 1, 5 and 10 to 14. As shown in FIGS. 1, 5 and 10, the cylindrical catalyst outer case 5 is fitted over the cylindrical catalyst inner case 4 through the thin plate ring-like inner case support body 7 having an I-shaped end surface, and stress (deformation force) of the catalyst outer case 5 is reduced by the thin plate inner case support body 7. As shown in FIG. 10, the inner case support body 7 includes an I-shaped thin plate portion 7a and an outer case connecting portion 7b. An inner diameter-side end edge of the I-shaped thin plate portion 7a is welded to a downstream side of the catalyst inner case 4 in the moving direction of exhaust gas. That is, the I-shaped thin plate portion 7a is made to stand substantially vertically on an outer surface of the catalyst inner case 4, and the I-shaped thin plate portion 7a is made to radially project from the outer surface of the catalyst inner case 4. The outer case connecting portion 7b is made to extend substantially perpendicularly from the outer diameter-side end edge of the I-shaped thin plate portion 7a. A cross section end surface of the inner case support body 7 is formed into an L-shape by the I-shaped thin plate portion 7a and the outer case connecting portion 7b.

An end of the outer case connecting portion 7b extends in the moving direction of exhaust gas (direction of center line of the cylindrical case 5) along the inner surface of the catalyst outer case 5. The outer case connecting portion 7b is welded to an inner surface of an intermediate portion of the catalyst outer case 5 in the moving direction of exhaust gas through a welding hole 5a which opens at the catalyst outer case 5. The welding hole 5a is closed by welding of the outer case connecting portion 7b. That is, as shown in FIGS. 1 and 10, the exhaust gas purifying device includes the diesel oxidation catalyst 2 or the soot filter 3 serving as the gas purifying filter which purifies exhaust gas discharged from the diesel engine 70, the catalyst inner case 4 or the filter inner case 20 serving as the inner case in which the diesel oxidation catalyst 2 or the soot filter 3 is provided, and the catalyst outer case 5 or the filter outer case 21 serving as the outer case in which the catalyst inner case 4 or the filter inner case 20 is provided. In the exhaust gas purifying device, the ring-like inner case support body 7 is provided between the catalyst inner case 4 and the catalyst outer case 5, the inner case support body 7 made of flexible material having vibration-reducing function is formed, and the catalyst inner case 4 is supported by the catalyst outer case 5 through the inner case support body 7.

As a result, vibration of the catalyst outer case 5 is reduced by the inner case support body 7, and vibration transmitted from the catalyst outer case 5 to the catalyst inner case 4 can be reduced. Accordingly, it is possible to easily prevent the deterioration in sealing ability of the diesel oxidation catalyst 2, and damage or drop-off of the catalyst outer case 5, the catalyst inner case 4, or the diesel oxidation catalyst 2. That is, deterioration in sealing ability of the catalyst outer case 5 or the catalyst inner case 4 can be reduced, and the durability of the diesel oxidation catalyst 2 can be enhanced.

Even in a filter configuration in which purifying ability of exhaust gas is enhanced, it is possible to easily enhance the maintenance operability of the soot filter 3 by combining a plurality of diesel oxidation catalyst 2 or the soot filter 3. It is possible to easily manage the temperature of the catalyst inner case 4 (diesel oxidation catalyst 2) by the thermal insulation of the space between the catalyst inner case 4 and the catalyst outer case 5. It is possible to maintain the temperature of the diesel oxidation catalyst 2 at a temperature suitable for catalyst (about 300° to 500°).

As shown in FIGS. 1, 5 and 10, the cross section end surface of the inner case support body 7 is formed from an I-shaped thin plate, one end of the inner case support body 7 is extended in a direction along the inner surface of the catalyst outer case 5, the outer case connecting portion 7b welded to the catalyst outer case 5 is formed at the extended portion on one end of the inner case support body 7, and the outer case connecting portion 7b is fixed to the inner surface of the catalyst outer case 5. Therefore, the catalyst inner case 4 is inserted into the catalyst outer case 5 in a state where the other end of the inner case support body 7 is welded to the outer surface of the catalyst inner case 4, and the outer case connecting portion 7b can be welded to the catalyst outer case 5 on outside of the catalyst outer case 5. The inner case support body 7 can be formed from the thin plate having such a thickness that is not limited by the welding operation. The assembling operability of the catalyst outer case 5 and the catalyst inner case 4 can be enhanced.

As shown in FIGS. 1, 5 and 10, the engine device includes the plurality of diesel oxidation catalyst 2 or soot filter 3, the catalyst inner case 4 or the filter inner case 20, and the catalyst outer case 5 or the filter outer case 21, the catalyst-side flange 25 or the filter-side flange 26 serving as a flange body which connects the catalyst outer case 5 or the filter outer case 21 is offset with respect to a connected position of the plurality of diesel oxidation catalyst 2 or soot filter 3, and the catalyst outer case 5 opposed to the one diesel oxidation catalyst 2 overlaps the filter inner case 20 oppose to the soot filter 3 on the other side. Therefore, an installation length of the plurality of diesel oxidation catalyst 2 or soot filter 3 in the moving direction of exhaust gas can be secured, the length of the plurality of catalyst outer case 5 or filter outer case 21 in the moving direction of exhaust gas can be shortened, rigidity of the plurality of catalyst outer case 5 or filter outer case 21 can be enhanced, and weight thereof can be reduced.

The catalyst outer case 5 overlaps the filter inner case 20 (soot filter 3 on the downstream side in the moving direction of exhaust gas). The filter inner case 20 is largely exposed by separation (disassemble) of the catalyst outer case 5 or the filter outer case 21. That is, an exposed range of an upstream end in the moving direction of exhaust gas of the soot filter 3 disposed on the downstream side in the moving direction of exhaust gas of the plurality of diesel oxidation catalyst 2 or soot filter 3 is increased, and a maintenance operation such as a removing operation of soot of the soot filter 3 on the downstream side in the moving direction of exhaust gas can be easily carried out. It is possible to enhance a maintenance operability such as a cleaning operability of the soot filter 3 which is carried out by separating the catalyst outer case 5 or the filter outer case 21 (catalyst inner case 4 or filter inner case 20) at the connecting portion of the catalyst-side flange 25 or the filter-side flange 26.

Figure 11:
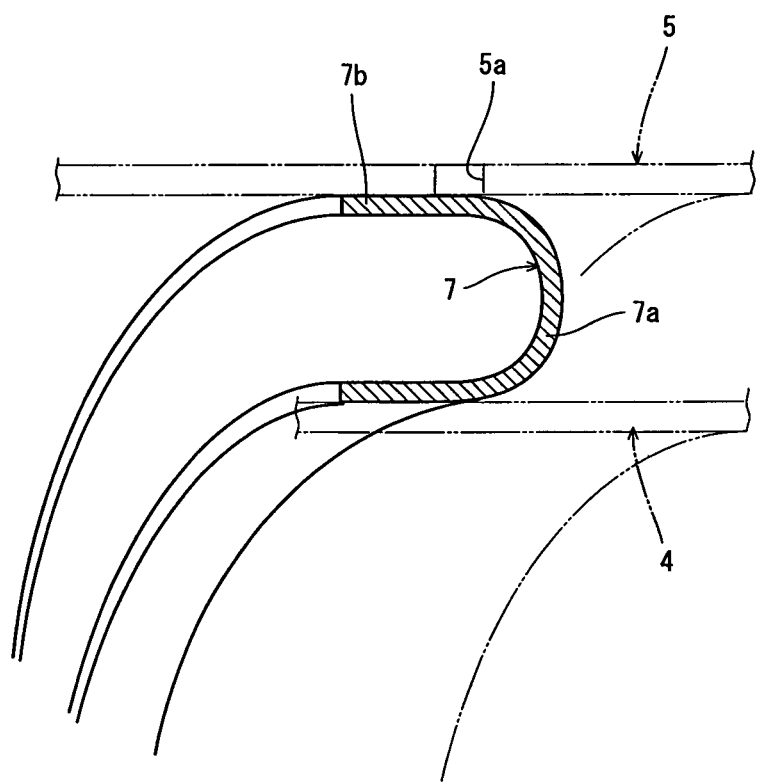
FIG. 11 is an enlarged sectional view of the inner case support body showing a modification of FIG. 10.
Figure 12:
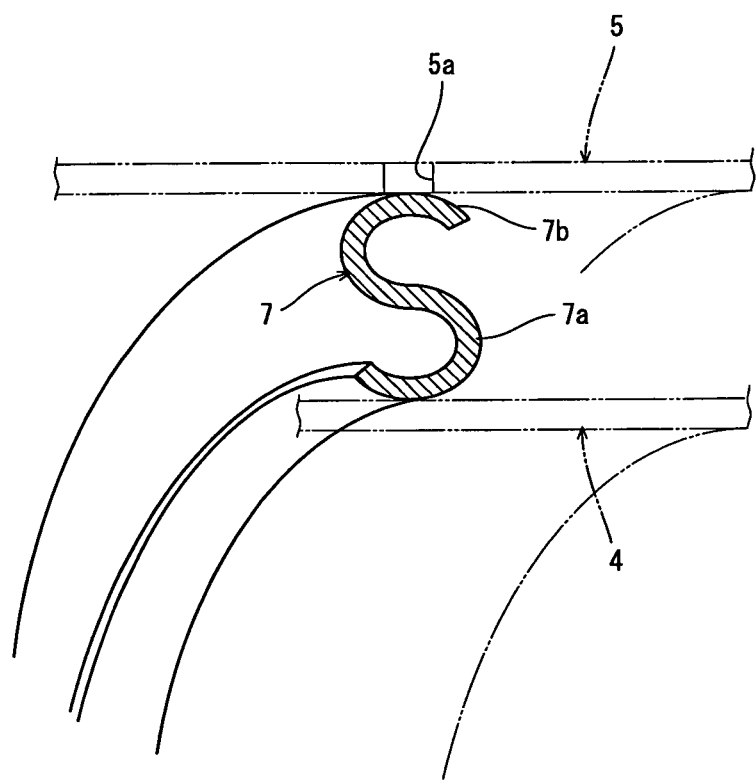
FIG. 12 is an enlarged sectional view of the inner case support body showing another modification of FIG. 10.
Figure 13:
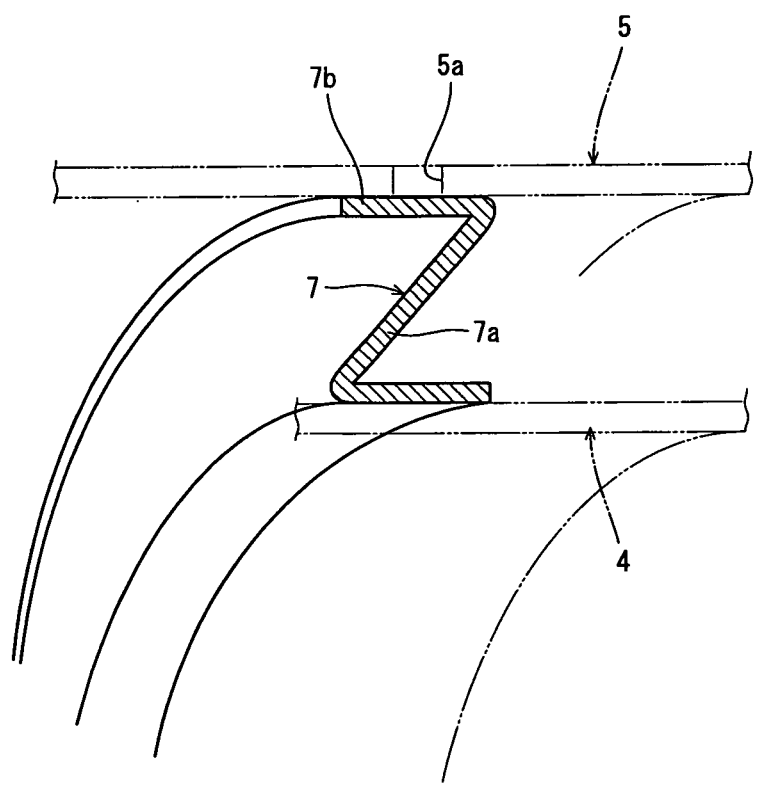
FIG. 13 is an enlarged sectional view of the inner case support body showing another modification of FIG. 10.
Figure 14:
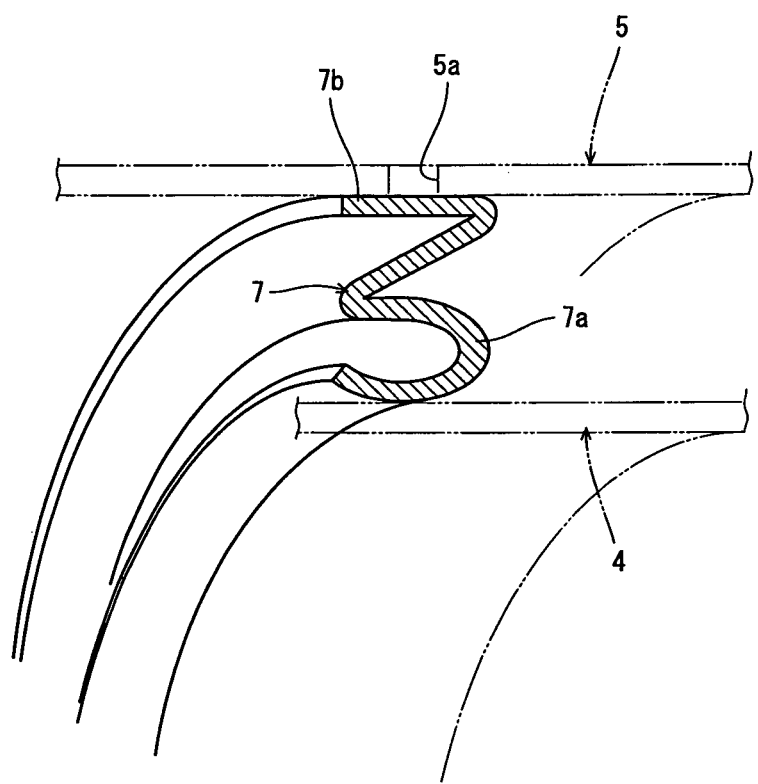
FIG. 14 is an enlarged sectional view of the inner case support body showing another modification of FIG. 10.

FIGS. 11 to 14 show deformed structures of the inner case support body 7 shown in FIG. 10. In the first embodiment, the inner case support body 7 is formed from the ring-like thin plate having the I-shaped end surface, but the inner case support body 7 may be formed from a ring-like thin plate having a U-shaped end surface as shown in FIG. 11. Further, the inner case support body 7 may be formed from a ring-like thin plate having an S-shaped end surface as shown in FIG. 12. The inner case support body 7 may be formed from a ring-like thin plate having a Z-shaped end surface as shown in FIG. 13. The inner case support body 7 may be formed from a ring-like thin plate having an end surface of a combined shape of Z and S as shown in FIG. 14.

As shown in FIGS. 10 to 13, the inner case support body 7 is formed from any one of the thin plate having the I-shaped end surface (see FIG. 10), the thin plate having the U-shaped end surface (see FIG. 11), the thin plate having the S-shaped end surface (see FIG. 12), and the thin plate having the Z-shaped end surface (see FIG. 13), and the catalyst inner case 4 is resiliently supported by the catalyst outer case 5 through the inner case support body 7. Therefore, for example, even in a filter configuration in which the purifying ability of exhaust gas is enhanced by providing a plurality sets of catalyst outer case 5 or filter outer case 21 and catalyst inner case 4 or filter inner case 20, and by combining the plurality of diesel oxidation catalyst 2 or soot filter 3, it is possible to support, with high rigidity, the outer surface of the downstream side end of the catalyst inner case 4 in the moving direction of exhaust gas by the inner surface of the catalyst outer case 5 at midpoint in the moving direction of exhaust gas through the inner case support body 7. It is possible to easily enhance a maintenance operability of an upstream end in the moving direction of exhaust gas of the soot filter 3 disposed on the downstream side in the moving direction of exhaust gas.

It is possible to easily prevent the deterioration in sealing ability of the diesel oxidation catalyst 2 or the soot filter 3, and damage or drop-off of the catalyst outer case 5, the filter outer case 21, the catalyst inner case 4, the filter inner case 20, the diesel oxidation catalyst 2, or the soot filter 3.

As shown in FIG. 14, the inner case support body is formed from the thin plate having a combination shape (see FIG. 14) of any two or more of the thin plate having the I-shaped end surface (see FIG. 10), the thin plate having the U-shaped end surface (see FIG. 11), the thin plate having the S-shaped end surface (see FIG. 12) and the thin plate having the Z-shaped end surface (see FIG. 13), and the catalyst inner case 4 is resiliently supported by the catalyst outer case 5 through the inner case support body 7. Therefore, for example, even in a filter configuration in which the purifying ability of exhaust gas is enhanced by providing a plurality sets of catalyst outer case 5 or filter outer case 21, and catalyst inner case 4 or filter inner case 20 and by combining the plurality of diesel oxidation catalyst 2 or soot filter 3, it is possible to support, with high rigidity, the outer surface of the downstream side end of the catalyst inner case 4 in the moving direction of exhaust gas by the inner surface of the catalyst outer case 5 at midpoint in the moving direction of exhaust gas through the inner case support body 7. It is possible to easily enhance a maintenance operability of an upstream end in the moving direction of exhaust gas of the soot filter 3 disposed on the downstream side in the moving direction of exhaust gas.

It is possible to easily prevent the deterioration in sealing ability of the diesel oxidation catalyst 2 or the soot filter 3, and damage or drop-off of the catalyst outer case 5, the filter outer case 21, the catalyst inner case 4, the filter inner case 20, the diesel oxidation catalyst 2, or the soot filter 3. A structure in which the diesel engine 70 is provided with the DPF 1 of the first embodiment will be described with reference to FIGS. 15 to 18, and 23. As shown in FIGS. 15 to 18, the exhaust manifold 71 and an intake manifold 73 are disposed in right and left side surfaces of the cylinder head 72 of the diesel engine 70. The cylinder head 72 is provided on the cylinder block 75 having an engine output shaft 74 (crankshaft) and a piston (not shown). A front end and a rear end of the engine output shaft 74 project from the front surface and a rear surface of the cylinder block 75. A cooling fan 76 is provided on the front surface of the cylinder block 75. A rotation force is transmitted from a front end of the engine output shaft 74 to the cooling fan 76 through a V-belt 77.

Figure 15:
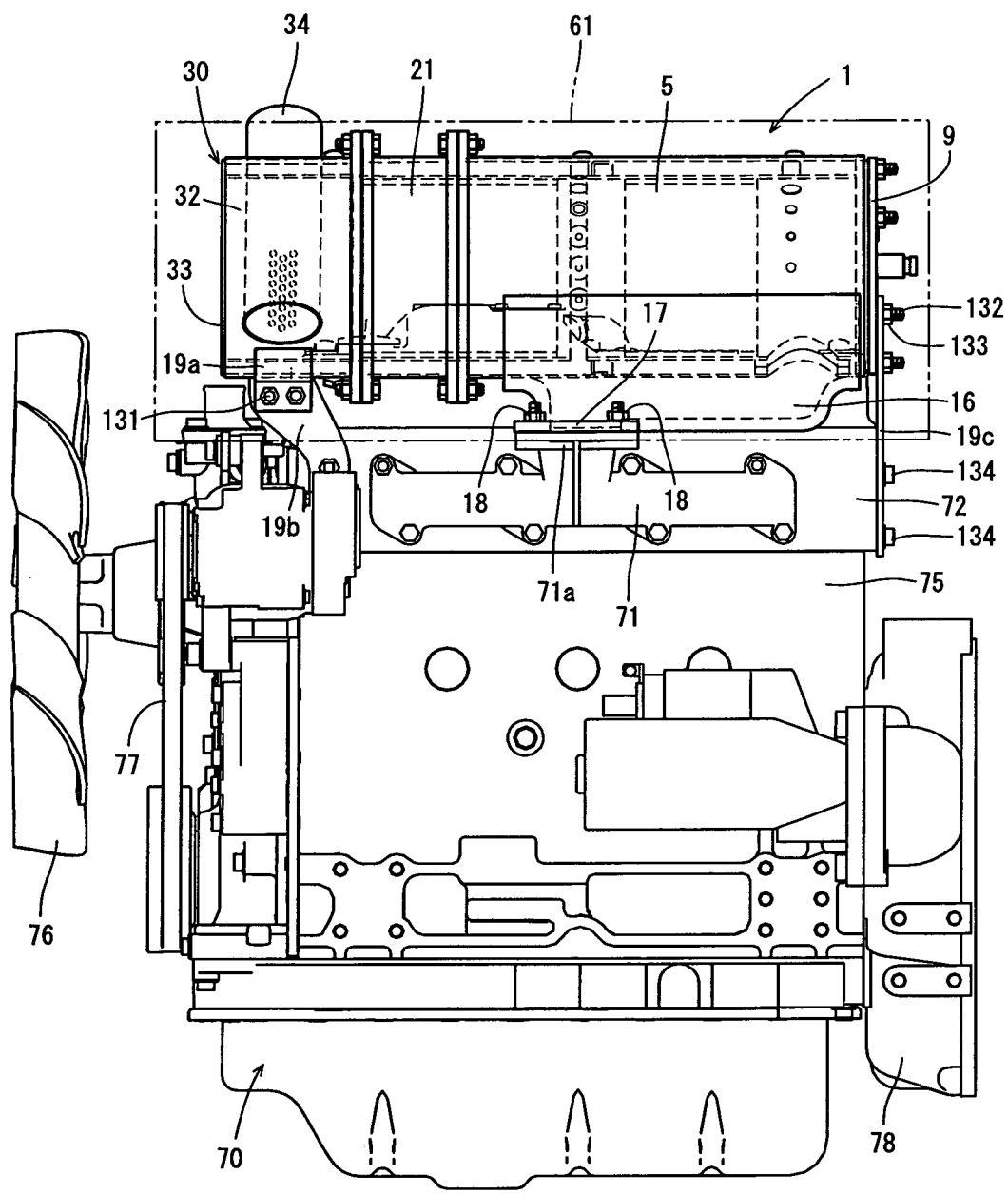
FIG. 15 is a left side view of a diesel engine.
Figure 16:
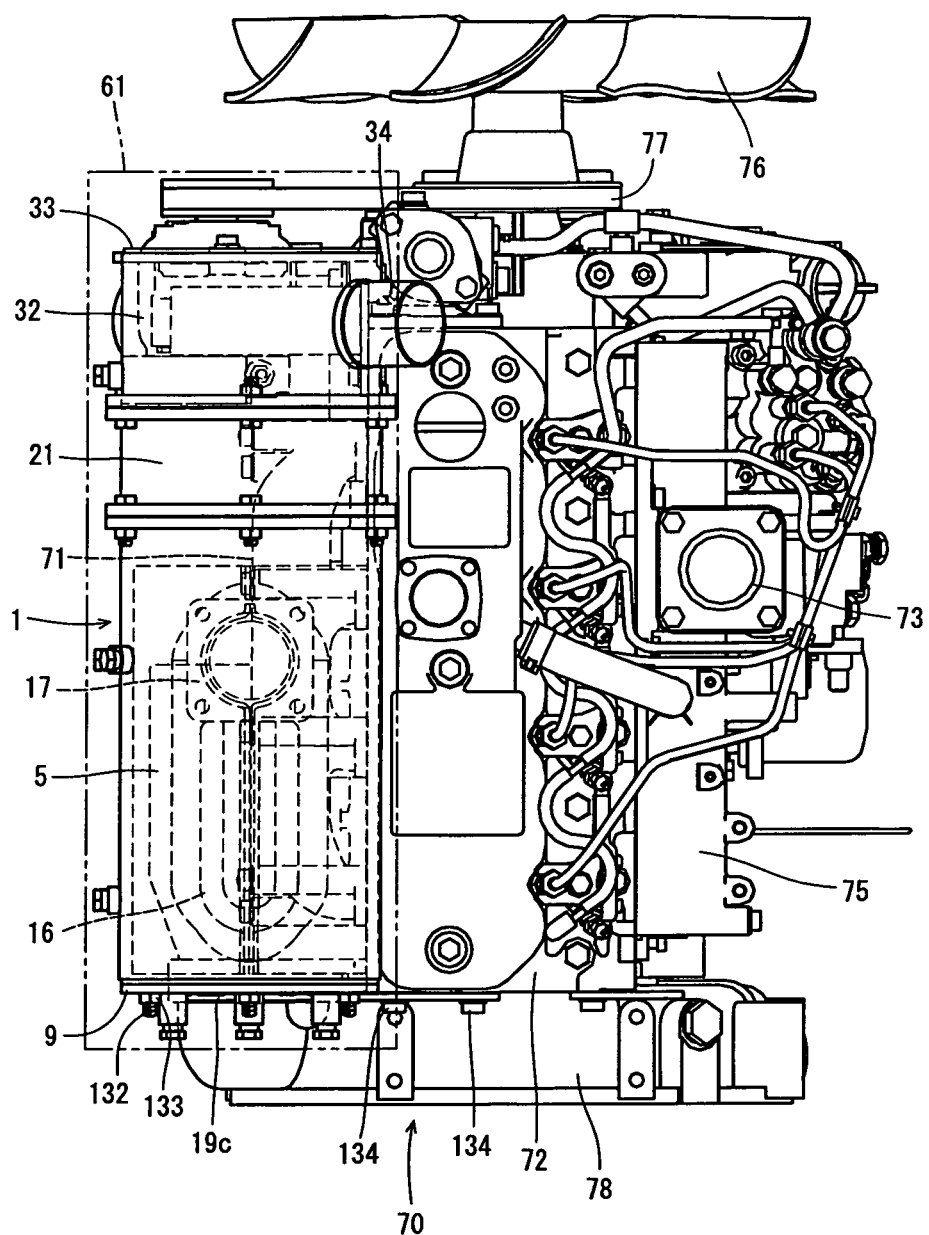
FIG. 16 is a plan view of the diesel engine.
Figure 18:
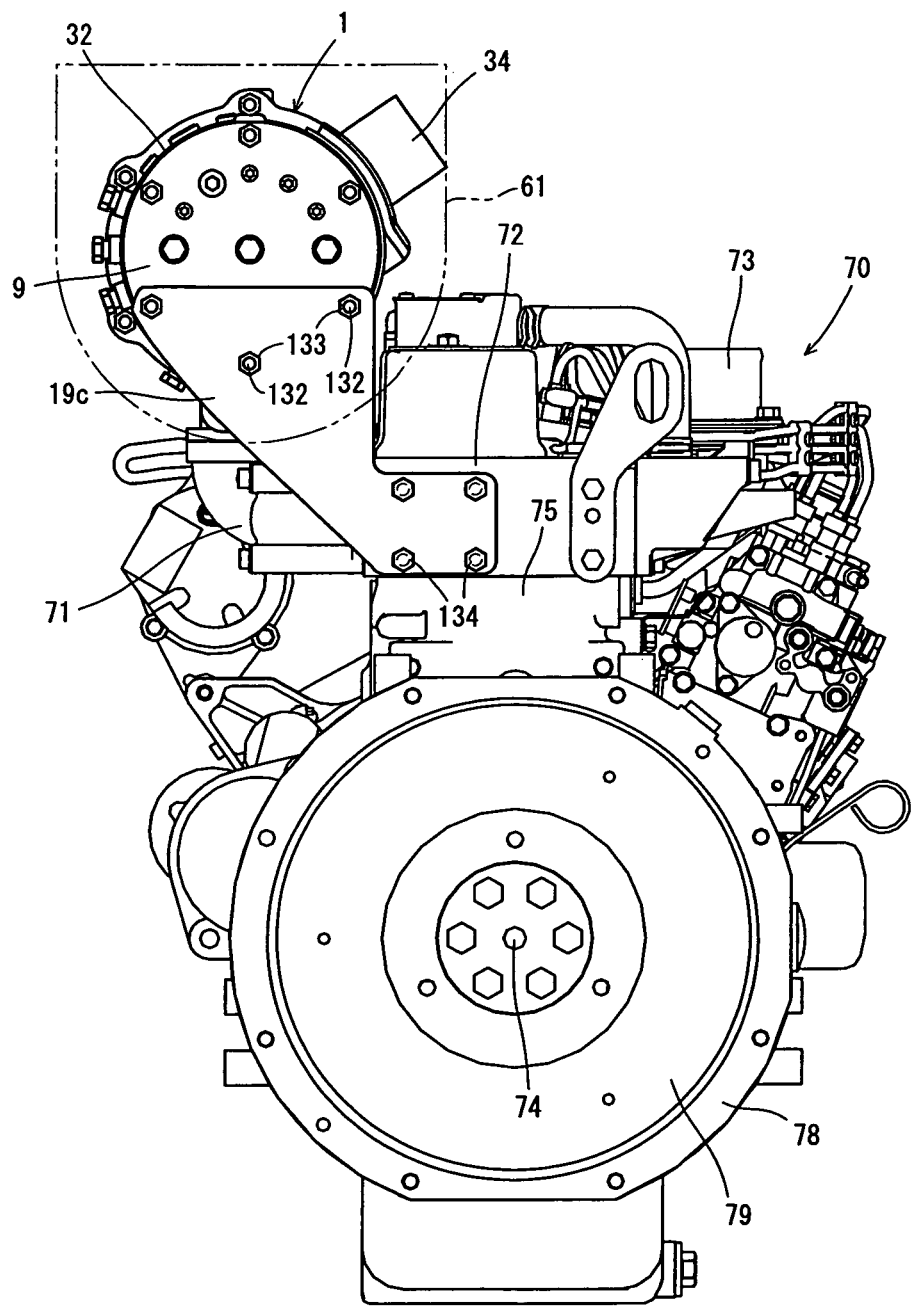
FIG. 18 is a back view of the diesel engine.

As shown in FIGS. 15, 16 and 18, a flywheel housing 78 is fixed to a rear surface of the cylinder block 75. A flywheel 79 is provided in the flywheel housing 78. The flywheel 79 is pivotally supported on a rear end of the engine output shaft 74. Power of the diesel engine 70 is taken out into operating portions such as later-described backhoe 100 and forklift 120 through the flywheel 79.

Figure 17:
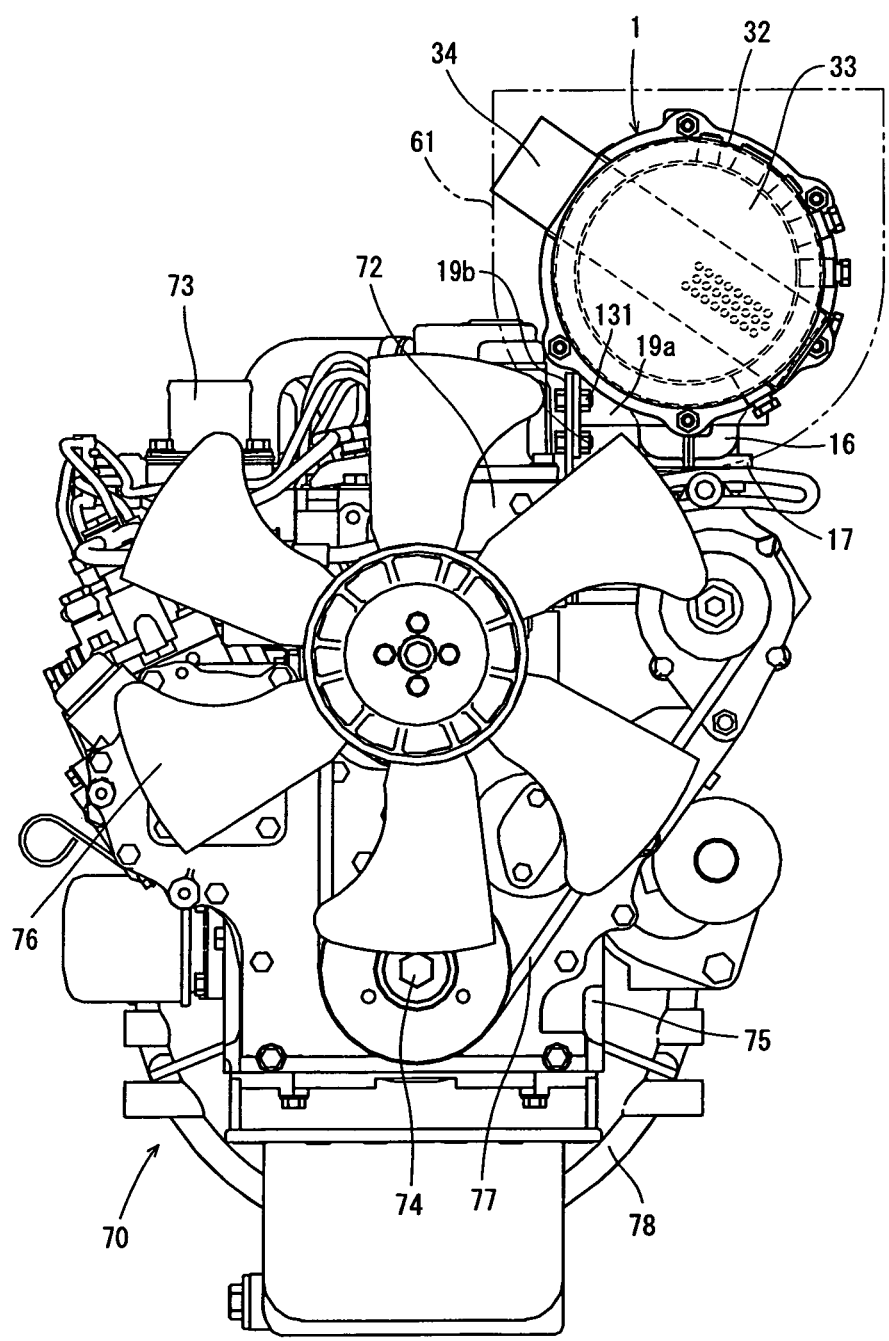
FIG. 17 is a front view of the diesel engine.

As shown in FIGS. 15, 17 and 18, one end of the first supporting leg 19a is welded and fixed to the silencing outer case 32. The other end of the first supporting leg 19a fixed to the silencing outer case 32 is detachably fastened, with bolts 131, to an upstream side of a second supporting leg 19b which is mounted on a portion of the cylinder head 72 close to the cooling fan 76. One end (upper end) of a third supporting leg 19c is detachably fastened to the side end surface of the catalyst outer case 5 on the side of the exhaust gas inflow opening 12 with bolts 132 and nuts 133. The other end (lower end) of the third supporting leg 19c is detachably fastened to the side end surface of the cylinder head 72 on the side of the flywheel housing 78 with bolts 134. The supporting legs 19a to 19c correspond to filter support bodies which support the DPF 1.

A connecting portion 71a of the exhaust manifold 71 connected with the exhaust connecting flange body 17 upwardly projects from a substantially central portion of the exhaust manifold 71. The exhaust connecting flange body 17 of the exhaust gas inlet tube 16 is detachably fastened to the connecting portion 71a of the exhaust manifold 71 with the bolts 18.

As shown in FIGS. 15 to 18, the DPF 1 of the first embodiment is long along the engine output shaft 74, and is disposed on the cylinder head 72 at a position close to the exhaust manifold 71. Therefore, the intake manifold 73 in the cylinder head 72 is outwardly exposed so that the maintenance operation can be facilitated. The exhaust gas inflow opening 12 and the exhaust gas outlet tube 34 (exhaust gas outflow opening) are laterally disposed on the side of the one end and on the side of the other end of the DPF 1 in its longitudinal direction.

A DPF hood 61 (see long dashed double-short dashed lines in FIGS. 15 to 18) which blocks wind wind from the cooling fan 76 from directly hitting the DPF 1 is provided on the side of the outer periphery of the DPF 1. The DPF hood 61 prevents a temperature of the DPF 1 and thus a temperature of exhaust gas in the DPF 1 from being lowered by the wind from the cooling fan 76, and maintains the temperature of exhaust gas.

As apparent from the above-described configuration, the DPF 1 of the first embodiment is connected to the exhaust manifold 71, and is also connected to the cylinder head 72 through the plurality of filter support bodies (supporting legs 19a to 19c). Therefore, there are effects that the DPF 1 can be disposed in the diesel engine 70 with high rigidity as one constituent part of the diesel engine 70, the need of exhaust gas countermeasures for each of devices of the utility vehicle is eliminated, and the general versatility of the diesel engine 70 can be enhanced.

That is, the DPF 1 is supported with high rigidity by utilizing the cylinder head 72 which is the high rigidity part of the diesel engine 70, and it is possible to prevent the DPF 1 from being damaged by vibration. There are merits that the DPF 1 can be assembled into the diesel engine 70 at the production site of the diesel engine 70 and the engine can be shipped out, and the diesel engine 70 and the DPF 1 can be configured together compactly.

Especially in the first embodiment, one end of the DPF 1 in the longitudinal direction is connected to the cylinder head 72 by the first and second supporting legs 19a and 19b, and the other end of the DPF 1 in the longitudinal direction is connected to the cylinder head 72 by the third supporting leg 19c. An intermediate portion of the DPF 1 in the longitudinal direction is connected to the exhaust manifold 71. Therefore, the DPF 1 can be connected to the diesel engine 70 with high rigidity by the three point support using the exhaust manifold 71 and the supporting legs 19a to 19c, which is effective for preventing the DPF 1 from being damaged by vibration.

The DPF 1 of the first embodiment is long along the engine output shaft 74, and disposed on the cylinder head 72 at a position close to the exhaust manifold 71. Therefore, the intake manifold 73 of the cylinder head 72 having many fine parts can be exposed, and it is easy to carry out the maintenance operation of the diesel engine 70. The exhaust manifold 71 can be communicated with the DPF 1 within a short distance, and the reduction in temperature of exhaust gas which passes through the DPF 1 can be suppressed as small as possible. Therefore, it is possible to maintain the exhaust gas purifying ability of the DPF 1 at a high level.

The exhaust gas inflow opening 12 and the exhaust gas outlet tube 34 (exhaust gas outflow opening) are laterally disposed on the side of the one end and on the side of the other end of the DPF 1 in its longitudinal direction. Therefore, it is possible to support the DPF 1 in a state where the DPF 1 is close to the upper surface of the cylinder head 72. Thus, it is possible to exhibit a high effect for preventing the DPF 1 from being damaged by vibration by utilizing rigidity of the cylinder head 72.

A modification of the mounting orientation of the DPF 1 will be described with reference to FIG. 23. As described above, in the DPF 1 of the first embodiment, the positional relation of the insertion holes of the exhaust connecting flange body 17 and the exhaust manifold 71 is set so that the exhaust connecting flange body 17 can be fastened to the exhaust manifold 71 with the bolts 18 even when the lateral mounting orientation (mounting orientation) of the DPF 1 is reversed (laterally reversed). That is, the downwardly-oriented opening end 16a of the exhaust gas inlet tube 16 is connected to the exhaust manifold 71 in a manner that the mounting orientation can be changed.

Figure 23:
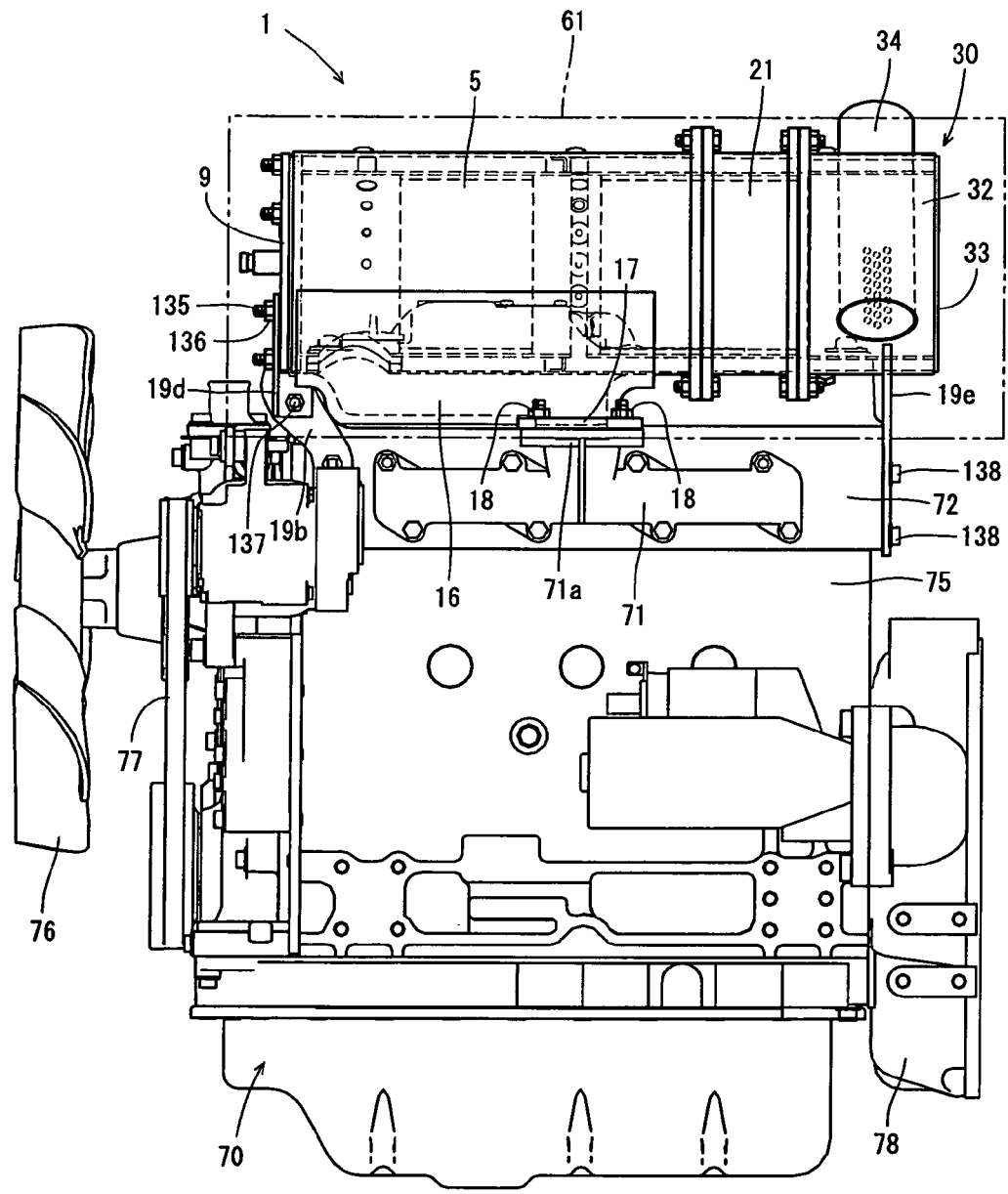
FIG. 23 is a left side view when a mounting orientation of the exhaust gas purifying device is turned 180° from the state shown in FIG. 15.

FIG. 23 shows one example when the mounting orientation of the DPF 1 with respect to the exhaust manifold 71 is reversed 180° from the state shown in FIG. 15. In this case, one end (upper end) of a fourth supporting leg 19d is detachably fastened to a side end surface of the catalyst outer case 5 on the side of the exhaust gas inflow opening 12 with bolts 135 and nuts 136. The other end (lower end) of the fourth supporting leg 19d is detachably fastened to an upper end of the second supporting leg 19b mounted on a portion of the cylinder head 72 close to the cooling fan 76.

One end of a fifth supporting leg 19e is welded and fixed to the silencing outer case 32. The other end of the fifth supporting leg 19e is detachably fastened to the side end surface of the cylinder head 72 on the side of the flywheel housing 78 with bolts 138. The fourth and fifth supporting legs 19d and 19e also correspond to the filter support bodies which support the DPF 1.

If a height relation between the cylinder head 72, the exhaust manifold 71, and the DPF 1 are taken into account, it is possible to change and adjust the mounting orientation 360° in the horizontal direction around the connecting portion 71a of the exhaust manifold 71 in addition to the turn-over (reverse 180°) of the DPF 1.

As apparent from the above-described configuration, according to the DPF 1 of the first embodiment, the exhaust gas inlet tube 16 having the downwardly-oriented opening end 16a (inlet side of exhaust gas) is provided in the intermediate portion of the catalyst outer case 5 in its longitudinal direction, the exhaust gas inflow opening 12 is provided on the one end of the catalyst outer case 5 in the longitudinal direction, the upwardly-oriented opening end 16b (outlet side of exhaust gas) of the exhaust gas inlet tube 16 is connected to the exhaust gas inflow opening 12 of the catalyst outer case 5, and the downwardly-oriented opening end 16a of the exhaust gas inlet tube 16 is connected to the exhaust manifold 71 of the diesel engine 70 in a manner that the mounting orientation can be changed.

Therefore, it is possible to select and change the orientation of the exhaust gas outflow opening (exhaust gas outlet tube 34) with respect to the catalyst outer case 5 without changing the structure of the catalyst outer case 5. Especially in the first embodiment, the downwardly-oriented opening end 16a of the exhaust gas inlet tube 16 is located at the central portion of the catalyst outer case 5 in the longitudinal direction, the catalyst outer case 5 is located between the cooling fan 76 located on the one side of the diesel engine 70 and the flywheel housing 78 located on the other side, and a mode in which the exhaust gas outlet tube 34 of the DPF 1 is disposed on the side of the cooling fan 76, and a mode in which the exhaust gas outlet tube 34 is disposed on the side of the flywheel housing 78 can be satisfied by the configuration of the one kind of DPF 1.

Therefore, since the configuration of the DPF 1 itself is not changed, there is no possibility that the tendency of exhaust emission (particulate material and NOx) in exhaust gas is changed, and there are effects that it is possible to omit labor for testing and checking and for shipping applying for each of utility machines having the diesel engine 70, and to reduce the producing cost.

Since the exhaust gas inlet tube 16 is mounted so as to cover the exhaust gas inflow opening 12 and extend in the longitudinal direction of the catalyst outer case 5, the exhaust gas inlet tube 16 itself functions as a reinforcing member of the catalyst outer case 5. Therefore, the rigidity of the catalyst outer case 5 can be enhanced and weight thereof can be reduced without providing a special reinforcing member. As compared with a structure having a special reinforcing member, the number of constituent parts can be reduced, and thus cost can be reduced.

Since the introducing passage 61 for exhaust gas is formed by the outer surface of the catalyst outer case 5 and the inner surface of the exhaust gas inlet tube 16, it is possible to heat the catalyst outer case 5 by exhaust gas in the exhaust gas inlet tube 16 (in the introducing passage 61), and to suppress the reduction in temperature of exhaust gas which passes through the DPF 1. Thus, this configuration can also contribute to enhancement of the exhaust gas purifying ability of the DPF 1.

Figure 19:
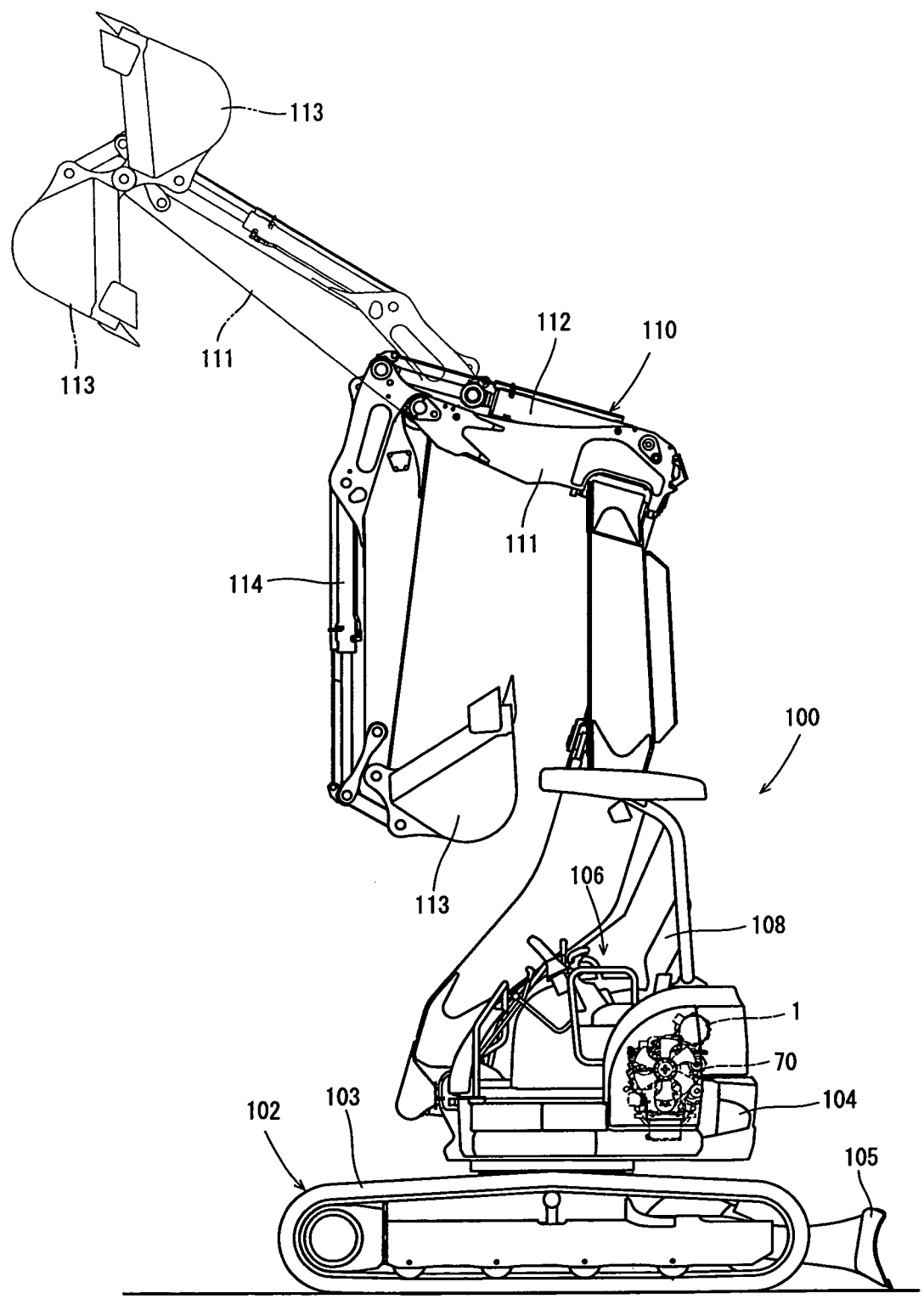
FIG. 19 is a side view of a backhoe.
Figure 20:
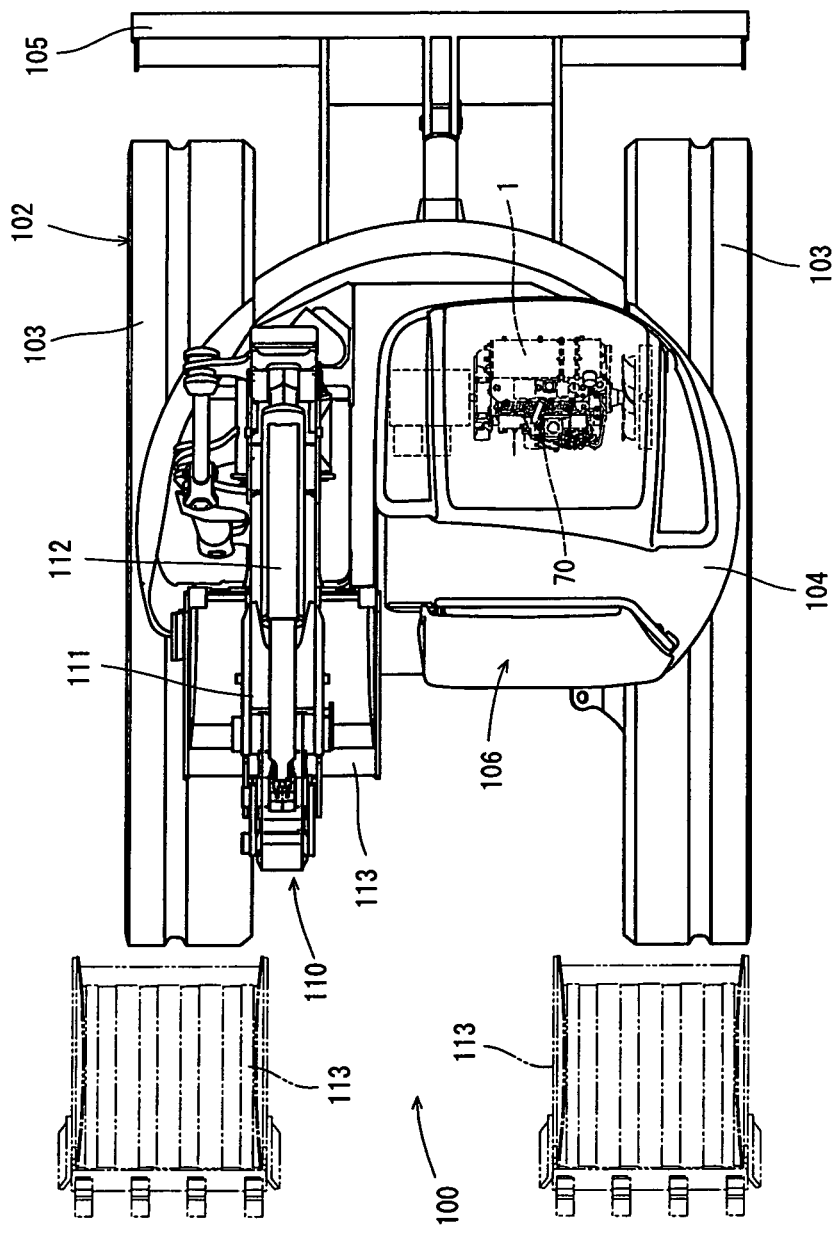
FIG. 20 is a plan view of the backhoe.

A structure in which the diesel engine 70 having the DPF 1 of the first embodiment is provided in the backhoe 100 will be described with reference to FIGS. 19 and 20. As shown in FIGS. 19 and 20, the backhoe 100 includes a crawler-type running device 102 having a pair of right and left running crawlers 103, and a turning body frame 104 provided on the running device 102. The turning body frame 104 can horizontally turn in all directions over 360° by a turning hydraulic motor. A ground operation moldboard 105 is mounted on a rear portion of the running device 102 in a manner that the moldboard 105 can vertically move. The driving portion 106 and the diesel engine 70 are provided on a left side of the turning body frame 104. An operating portion 110 having a boom 111 and a bucket 113 for excavating operation is provided on a right side of the turning body frame 104.

A driving seat 108 on which an operator sits, operating means for outputting operation of the diesel engine 70, and a lever or a switch as operating means for the operating portion 110 are disposed on the driving portion 106. A boom cylinder 112 and a bucket cylinder 114 are disposed on the boom 111 which is a constituent element of the operating portion 110. The bucket 113 serving as an excavating attachment is pivotally attached to a tip end of the boom 111 in a manner that the bucket 113 can scoop and turn. The boom cylinder 112 or the bucket cylinder 114 is operated, and earthwork (ground operation such as groove forming operation) is carried out by the bucket 113.

Figure 21:
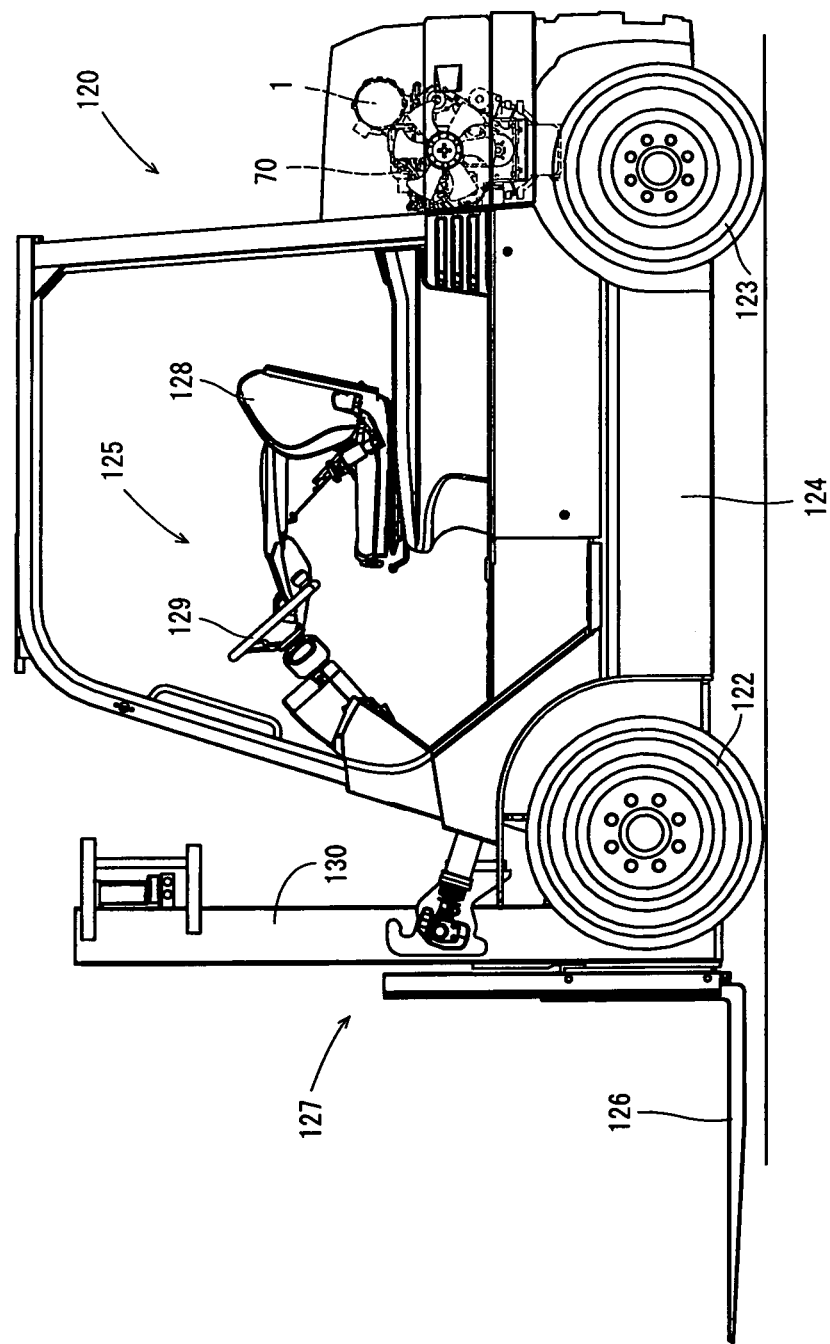
FIG. 21 is a side view of a forklift car.
Figure 22:
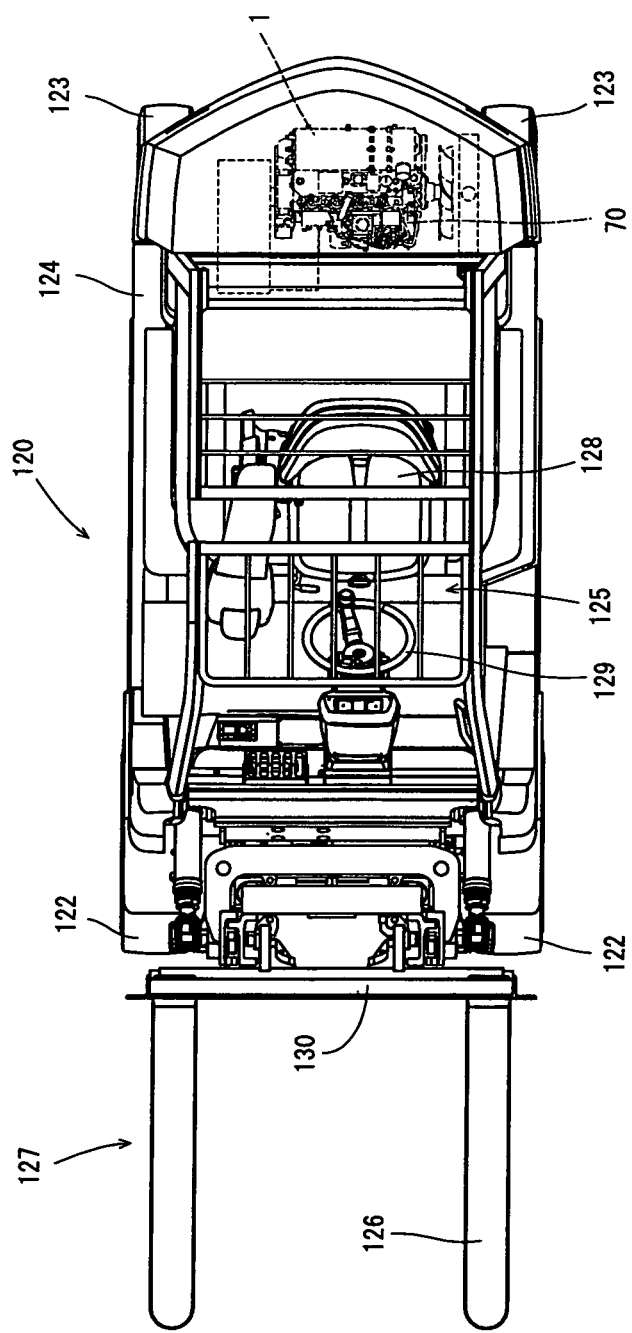
FIG. 22 is a plan view of the forklift car.

A structure in which the diesel engine 70 having the DPF 1 of the first embodiment is provided in a forklift car 120 will be described with reference to FIGS. 21 and 22. As shown in FIGS. 21 and 22, the forklift car 120 includes a running body frame 124 having a pair of right and left front wheels 122 and a pair of right and left rear wheels 123. A driving portion 125 and the diesel engine 70 are provided in the running body frame 124. An operating portion 127 having a fork 126 for a cargo-handling operation is provided on a front side of the running body frame 124. A driving seat 128 on which an operator sits, a steering wheel 129, operating means for outputting operation of the diesel engine 70, and a lever or a switch as operating means for the operating portion 127 are disposed on the driving portion 125.

The fork 126 is disposed on a mast 130 which is a constituent element of the operating portion 127 in a manner that the fork 126 can vertically move. The fork 126 is vertically moved, a palette (not shown) with a cargo is placed on the fork 126, the running body frame 124 is moved back-and-forth, and the cargo-handling operation such as transportation of the palette is carried out.

Next, an entire structure of an exhaust gas purifying device (DPF 1') and a structure of a diesel engine 70 having the DPF 1' will be described with reference to FIGS. 24 to 29. Members of the second embodiment having the same configurations and effects as those in the first embodiment are designated with the same symbols, and detailed description thereof will be omitted. Points different from those in the first embodiment will be described below.

Figure 24:
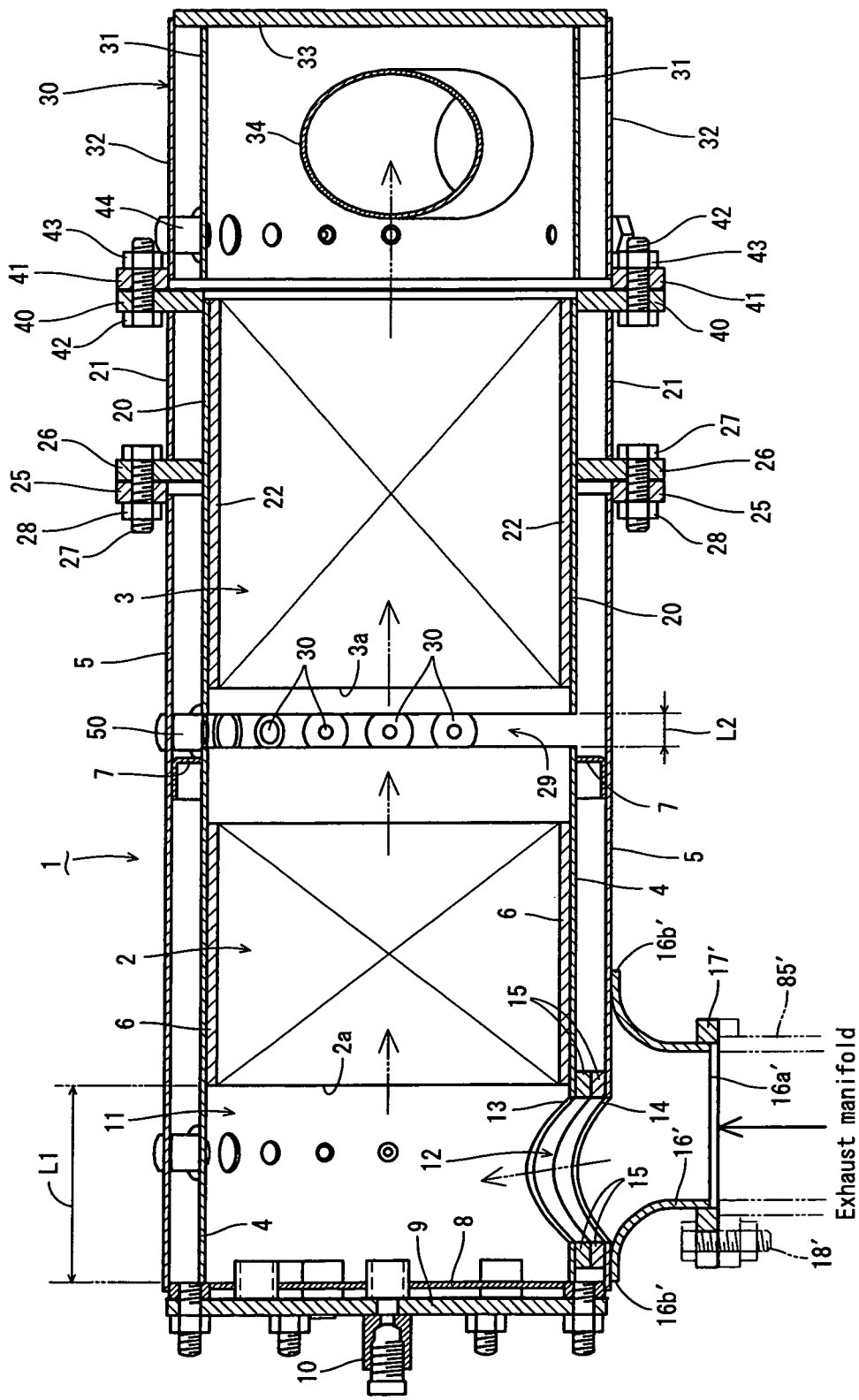
FIG. 24 is a front sectional view of an exhaust gas purifying device in a second embodiment.
Figure 25:
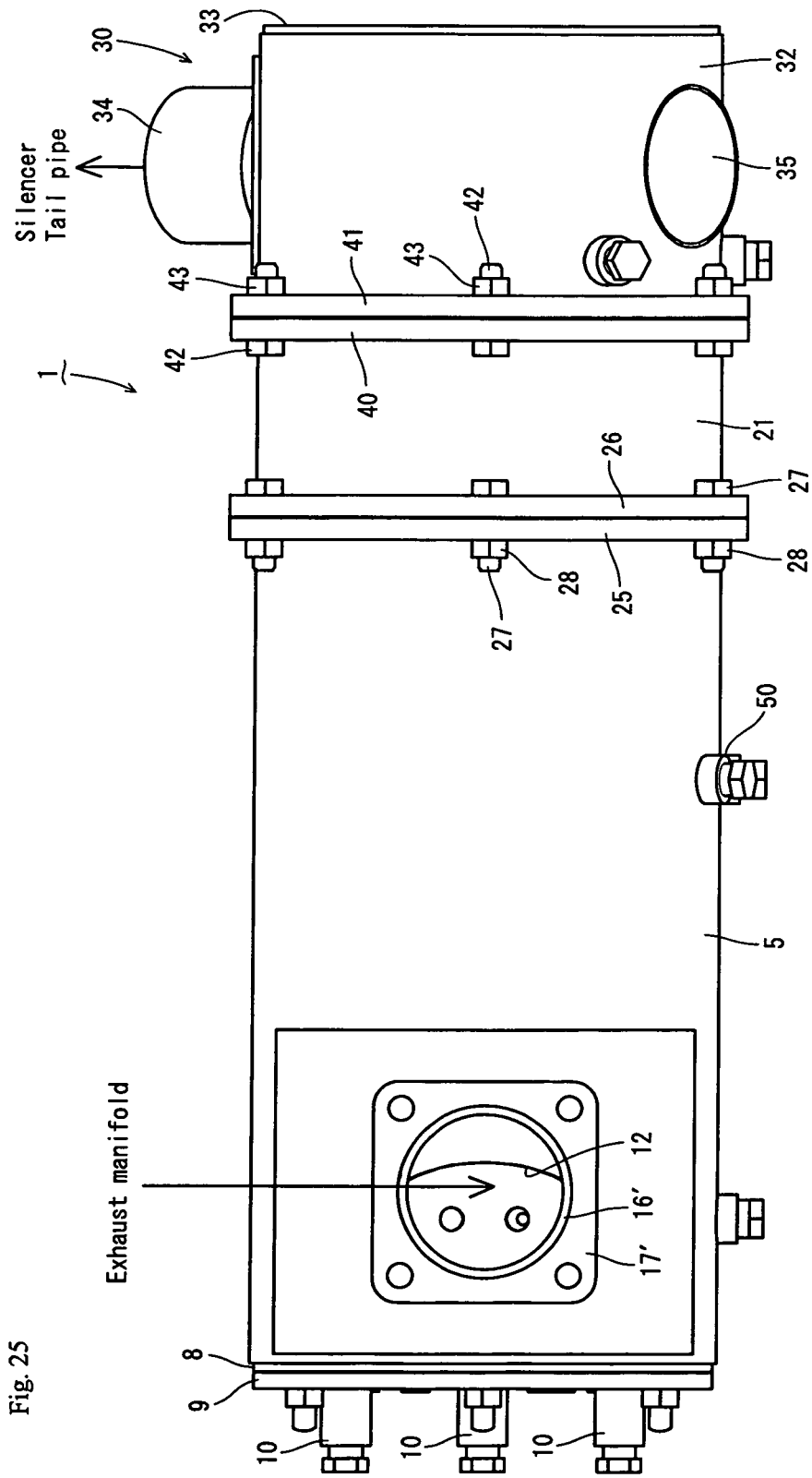
FIG. 25 is a bottom view of an exterior appearance thereof.

As shown in FIGS. 24 and 25, according to the DPF 1' of the second embodiment, an exhaust gas inlet tube 16' is disposed on an outer surface of the catalyst outer case 5 in which the exhaust gas inflow opening 12 is formed. An exhaust connecting flange body 17' is welded to a small diameter perfect circle opening end 16a' of the exhaust gas inlet tube 16'. The exhaust connecting flange body 17' is fastened to the exhaust manifold 71 of the later-described diesel engine 70 with bolts 18'. A large diameter perfect circle opening end 16b' of the exhaust gas inlet tube 16' is welded to an outer surface of the catalyst outer case 5. The exhaust gas inlet tube 16' spreads out wide (trumpet shape) from the small diameter perfect circle opening end 16a' toward the large diameter perfect circle opening end 16b'.

As shown in FIG. 24, a left end of the large diameter perfect circle opening end 16b' is welded to an outer surface of a left end of the opening edge 14 of the outer surface of the catalyst outer case 5. That is, the exhaust gas inlet tube 16' (large diameter perfect opening end 16b') is offset toward the downstream in the moving direction of exhaust gas (right side of the catalyst outer case 5) with respect to the elliptic exhaust gas inflow opening 12. That is, the elliptic exhaust gas inflow opening 12 is offset toward the upstream in the moving direction of exhaust gas (left side of the catalyst outer case 5) with respect to the exhaust gas inlet tube 16' (large diameter perfect opening end 160, and is formed in the catalyst outer case 5. Other configuration is the same as that of the DPF 1' in the first embodiment.

Figure 26:
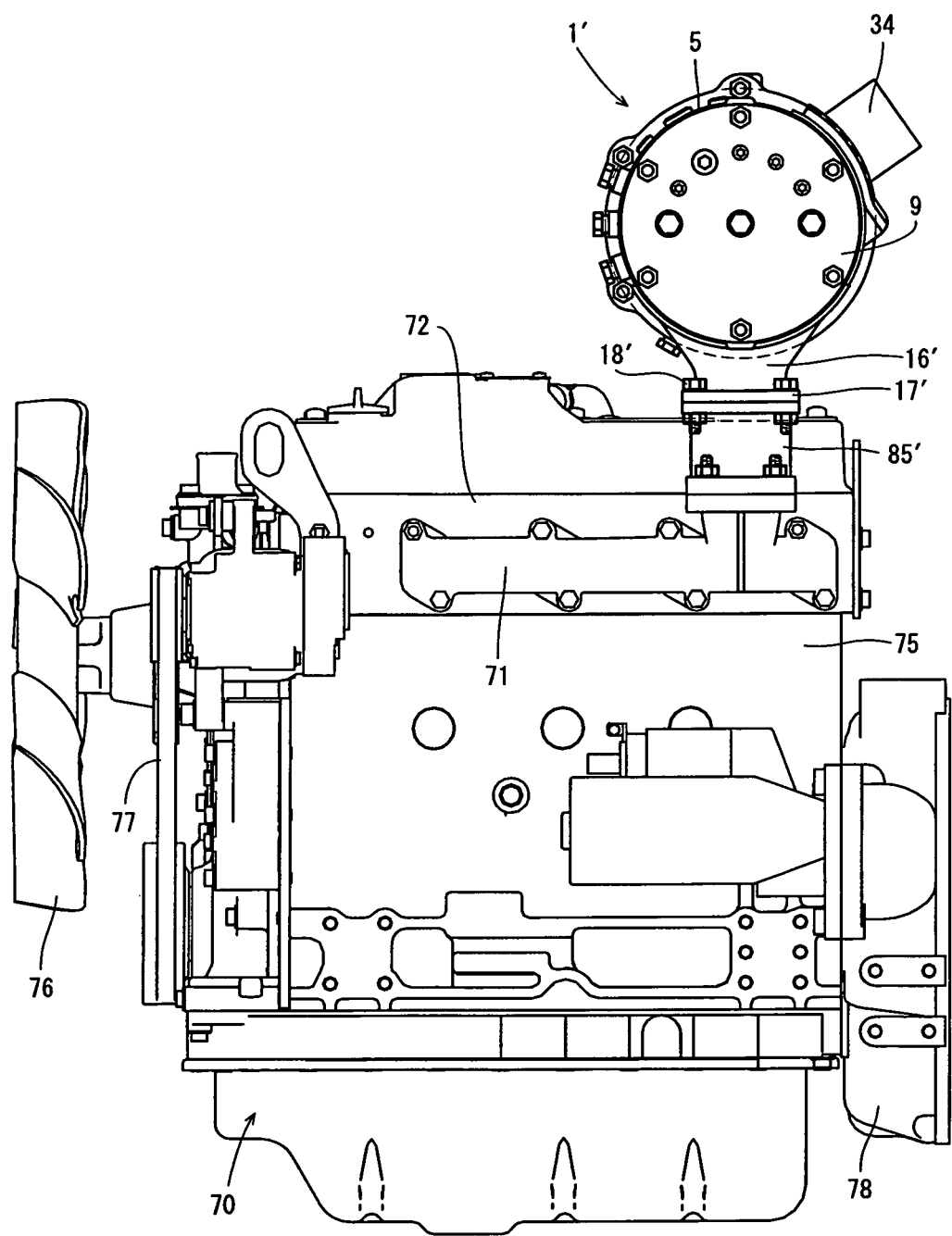
FIG. 26 is a left side view of a diesel engine.
Figure 27:
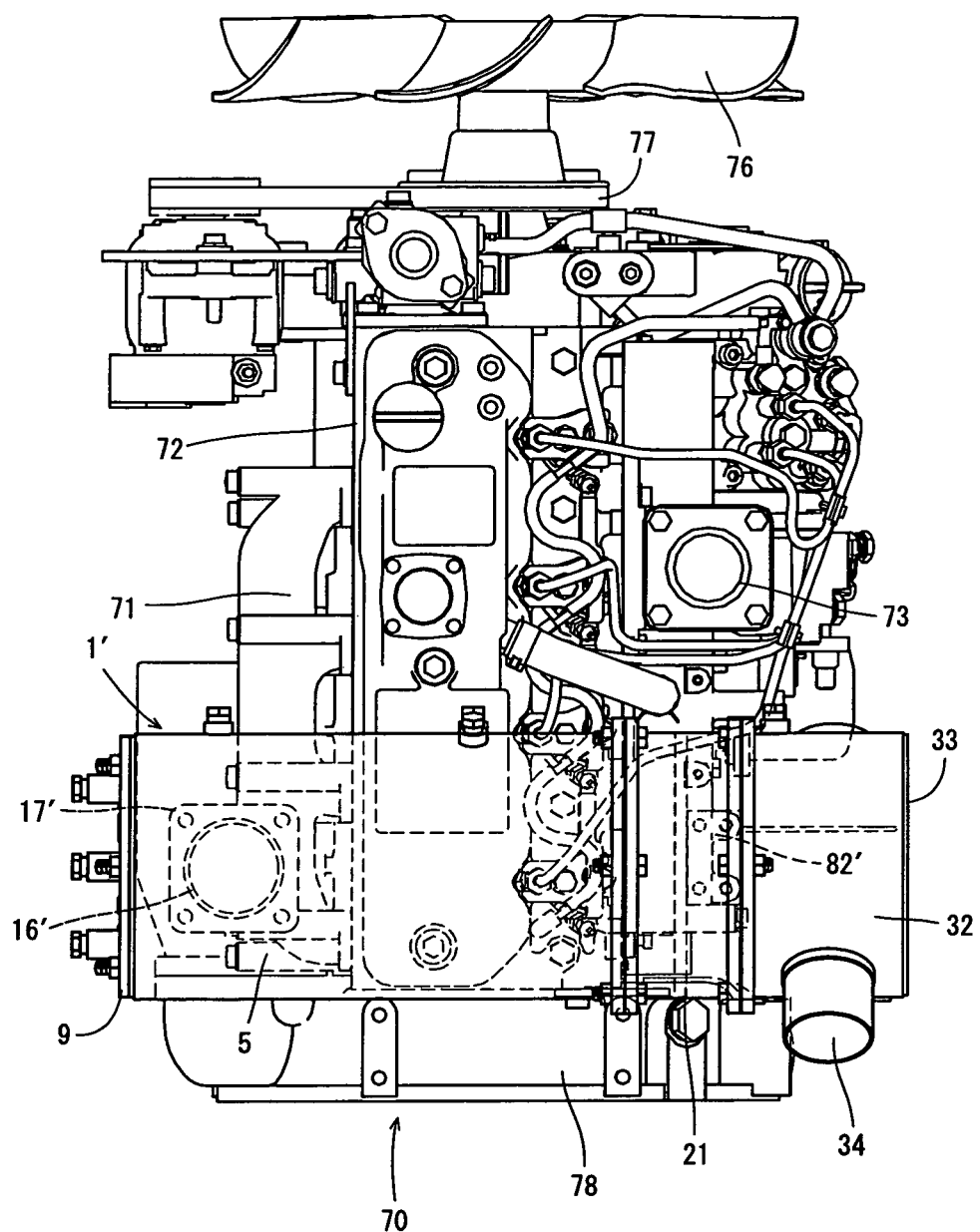
FIG. 27 is a plan view of the diesel engine.
Figure 28:
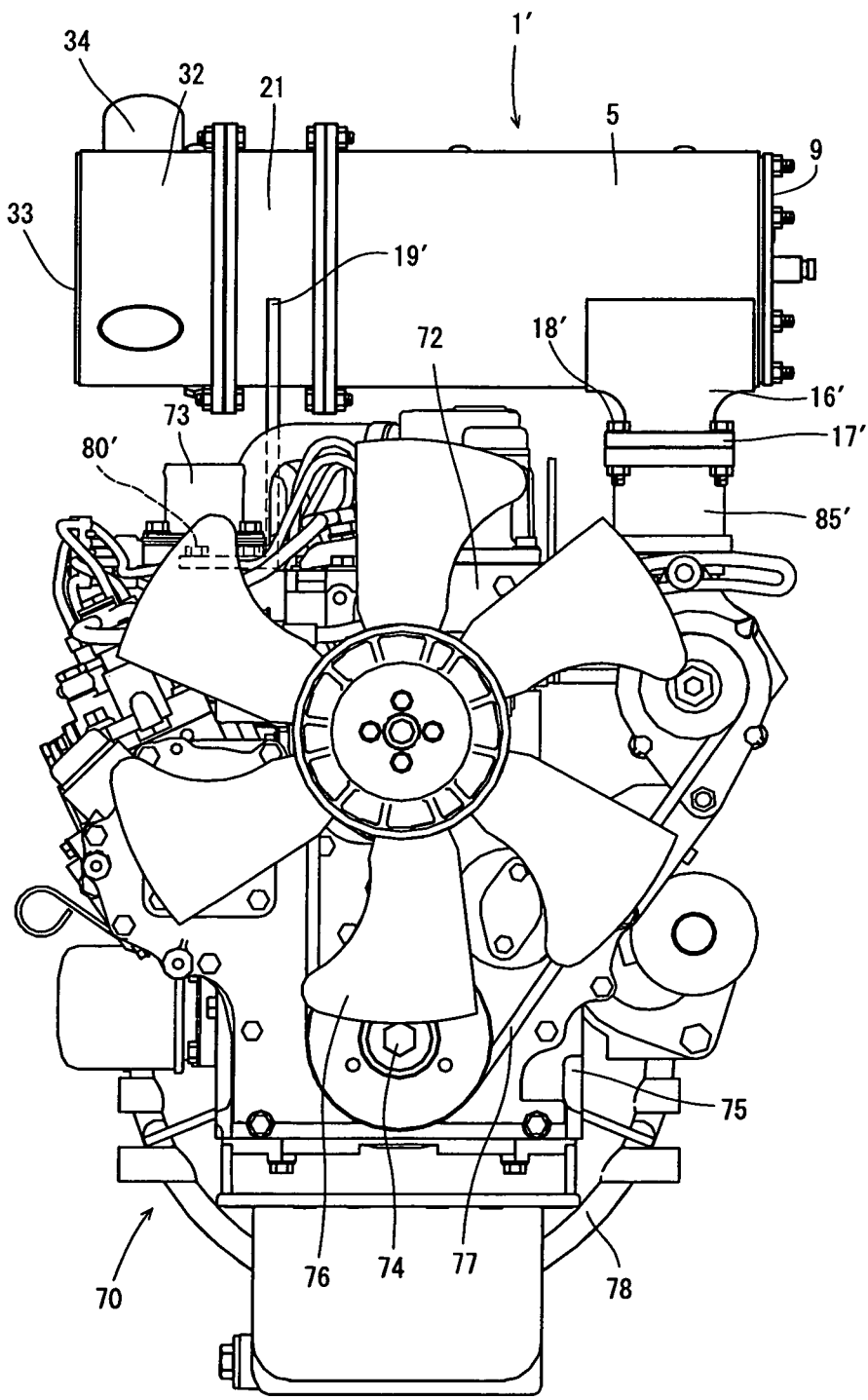
FIG. 28 is a front view of the diesel engine.
Figure 29:
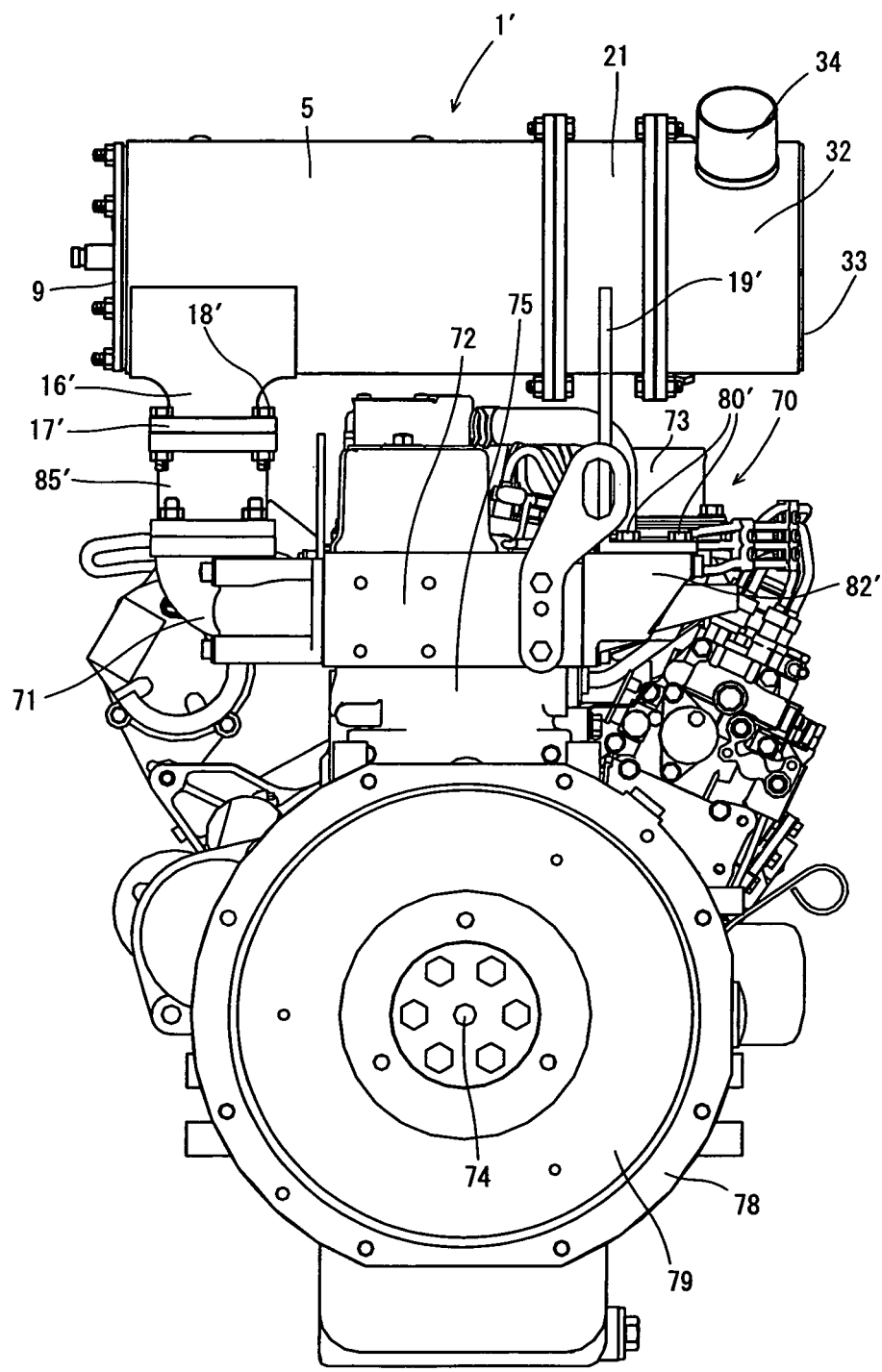
FIG. 29 is a back view of the diesel engine.

Next, the structure in which the DPF 1' is mounted in the diesel engine 70 will be described. As shown in FIGS. 26, 28 and 29, one end of a supporting leg 19' as the filter support body is welded and fixed to the filter outer case 21. The other end of the supporting leg 19' is detachably fastened, with bolts 80', to a mounting portion 82' on the intake manifold 73 which is strongly fixed to the cylinder head 72. Therefore, a portion of the DPF 1' close to the intake manifold 73 (on the side of the filter outer case 21) is supported by the cylinder head 72 with high rigidity by the supporting leg 19' and the intake manifold 73.

As shown in FIGS. 26 to 29, the DPF 1' of this embodiment is long in a direction perpendicular to the engine output shaft 74, and the DPF 1' is disposed close to the flywheel housing 78 such that the moving direction of exhaust gas is in the direction perpendicular to the engine output shaft 74 above the cylinder head 72. Thus, upper surfaces of the cylinder head 72, the exhaust manifold 71 and the intake manifold 73 are exposed in a wide range, and the maintenance operation can easily be carried out.

The exhaust gas inlet tube 16' is detachably connected to the exhaust manifold 71 of the diesel engine 70 through a relay exhaust tube 85'. Exhaust gas moves into the DPF 1' from the exhaust manifold 71 of the diesel engine 70 through the relay exhaust tube 85' and the exhaust gas inlet tube 16', is purified by the DPF 1', moves into the tail pipe (not shown) from the exhaust gas outlet tube 34, and is finally discharged outside of the device.

As apparent from the above-described configuration, in the second embodiment, the intake manifold 73 and the exhaust manifold 71 are disposed on the upper portion of the engine 70 on both sides of the cylinder head 72 of the engine 70 as viewed from above, and the DPF 1' is connected to the exhaust manifold 71 and the intake manifold 73 above the engine 70. Since the exhaust manifold 71, the intake manifold 73, and the cylinder head 72 which are high rigidity parts of the engine are utilized, the DPF 1' can be supported with higher rigidity than that of the first embodiment, and it is possible to effectively prevent the DPF 1' from being damaged by vibration.

The DPF 1' can be assembled into the engine 70 at the production site of the engine 70 and the engine 70 can be shipped out, and there is an advantage that the engine 70 and the DPF 1' can be configured together compactly. Since the DPF 1' can be assembled into the engine 70 and it can be shipped out as described above, it is possible to omit labor for shipping application for each of utility machines having the engine 70, and to reduce the producing cost. Further, since the DPF 1' can be communicated with the exhaust manifold 71 within a short distance, it is easy to maintain a temperature of the DPF 1' at an appropriate value, and the high exhaust gas purifying ability. This configuration can also contribute to reduction of the DPF 1' in size.

As shown in FIGS. 26 to 29, the DPF 1' is long in the direction perpendicular to the engine output shaft 74, and is disposed on the cylinder head 72 at a position close to the flywheel housing 78. Therefore, the upper surfaces of the cylinder head 72, the exhaust manifold 71 and the intake manifold 73 can be widely exposed. Thus, there is an effect that the maintenance operation of the engine 70 is easily carried out.

Since the DPF 1' is disposed on the cylinder head 72 at the position close to the flywheel housing 78, the DPF 1' is separated away from the cooling fan 76 of the engine 70. Therefore, wind from the cooling fan 76 does not easily hit directly the DPF 1', it is possible to suppress the reduction in a temperature of the DPF 1' and thus in a temperature of exhaust gas in the DPF 1' by the wind from the cooling fan 76, and to maintain the exhaust gas temperature.

As shown in FIGS. 26 to 29, the exhaust gas inlet tube 16' and the exhaust manifold 71 connected to the exhaust gas inflow opening 12 of the DPF 1 are detachably connected to each other through the relay exhaust tube 85. Therefore, due to the existence of the relay exhaust tube 85, it is possible to dispose the DPF 1', close to the upper surface of the engine 70 avoiding a projecting part on the side of the upper surface of the engine 70, and to configure the engine 70 with the DPF 1' assembled compactly.

As shown in FIGS. 26 to 29, a portion of the DPF 1' close to the intake manifold 73 (on the side of the filter outer case 21) is detachably connected to the high rigidity intake manifold 73 by the supporting leg 19' serving as the filter support body. Therefore, it is possible to stably connect the DPF 1' to the engine 70, avoiding a projecting part on the side of the upper surface of the engine 70. This is effective for preventing the damage of the DPF 1' caused by vibration.

The diesel engine having the DPF 1' of the second embodiment can be mounted on the backhoe 100 or the forklift car 120 of course. Configurations of various portions of the present invention of this application are not limited to those described in the embodiments, and the invention can be variously changed within a range not departing from the subject matter of the invention of this application.

REFERENCE NUMERALS

1 DPF
2 diesel oxidation catalyst (gas purifying filter)
3 soot filter (gas purifying filter)
4 catalyst inner case
5 catalyst outer case
16 exhaust gas inlet tube
16a downwardly-oriented opening end
16b upwardly-oriented opening end
19a to 19e supporting legs
20 filter inner case
21 filter outer case
34 exhaust gas outlet tube
60 exhaust gas introducing passage
70 diesel engine
71 exhaust manifold
72 cylinder head
73 intake manifold
78 flywheel housing

The invention claimed is:

1. An engine device comprising:
an engine having an exhaust manifold through which exhaust gas from the engine is output;
an exhaust gas purifying device that receives the exhaust gas output from the exhaust manifold and that purifies the received exhaust gas, the exhaust gas purifying device having an elongated shape extending longitudinally relative to a longitudinal direction of an output shaft of the engine, and being disposed on a cylinder head of the engine at a position close to the exhaust manifold; and
an exhaust gas inlet half-tube having a half-cylindrical shape in which a wall of the half-tube forms the half-cylindrical shape in a lengthwise direction of the half-tube, the half-tube being open in a transverse direction to an outer surface of the exhaust purifying device, the exhaust gas inlet half-tube being attached to and extending in said longitudinal direction of the exhaust gas purifying device to form an exhaust gas introducing passage between said exhaust manifold and said exhaust gas purifying device, the exhaust gas introducing passage being circumferentially delimited by said wall of the half-tube along part of a circumference of the passage and by an outer surface of an adjacent portion of the exhaust gas purifying device along a remaining, part of said circumference of the passage; and
wherein the cylinder head includes a plurality of filter support bodies which supports the exhaust gas purifying device, the exhaust gas purifying device being connected to the exhaust manifold, and one end of the exhaust gas purifying device and an oilier end in the longitudinal direction being detachably connected to the cylinder head through the plurality of filter support bodies;
wherein an exhaust gas inflow opening and an exhaust gas outflow opening are respectively disposed on said one end of the exhaust gas purifying device and said other end, and said exhaust gas inlet half-tube covers the exhaust gas inflow opening;
wherein the exhaust gas inlet half-tube has a first end at said exhaust gas inflow opening at said one end of the exhaust gas purifying device and has a second end at which is received exhaust gas from the exhaust manifold, and wherein a first opening at said second end of the exhaust gas inlet half-tube is provided at a longitudinal center region of the exhaust gas purifying device and communicates with and is connected to the exhaust manifold, and wherein said exhaust gas introducing passage extends from said second end to said first end; and
wherein all exhaust gas flow into the exhaust gas purifying device exits the exhaust manifold from a single exit opening in the exhaust gas manifold and enters the exhaust gas inlet half-tube via a single inlet opening in the exhaust gas inlet half-tube, the single exit opening abutting the single inlet opening.

2. An engine device comprising:
an engine having an exhaust manifold through which exhaust gas from the engine is output;
an exhaust gas purifying device that receives the exhaust as output from the exhaust as manifold and that purifies the received exhaust gas, the exhaust gas purifying device having an elongated shape extending longitudinally relative to a longitudinal direction of an output shaft of the engine, and being disposed on a cylinder head of the engine at a position close to the exhaust manifold;
wherein the cylinder head includes a plurality of filter support bodies which supports the exhaust gas purifying device, the exhaust gas purifying device being connected to the exhaust manifold, and one end region of the exhaust gas purifying device and another end region in the longitudinal direction being detachably connected to the cylinder head through the plurality of filter support bodies;
wherein the exhaust gas purifying device has an exhaust gas inflow opening at said one end region and an exhaust gas outflow opening at said another region;
wherein an exhaust gas inlet passage is formed along an exterior surface of the exhaust gas purifying device as a space between said external surface and a member attached to the exhaust gas purifying device;
wherein said member has a half-cylindrical shape in which a wall of the member forms the half-cylindrical shape in a lengthwise direction of the member, the member being open in a transverse direction to an outer surface of the exhaust purifying device, the member being attached to and extending in said longitudinal direction of the exhaust as purifying device to form an exhaust gas introducing passage between said exhaust manifold and said exhaust gas purifying device, the exhaust gas introducing passage being circumferentially delimited by said wall of the half-tube along part of a circumference of the passage and by an outer surface of an adjacent portion of the exhaust gas purifying device along a remaining part of said circumference of the passage;

wherein said exhaust gas inlet passage is configured so that the exhaust gas flows from the exhaust manifold into said member opening, along the exterior surface of the exhaust gas purifying device which defines an internal wall of said exhaust gas inlet passage, and into said exhaust gas inflow opening of said exhaust gas purifying device; and wherein all exhaust gas flow into the exhaust gas purifying device exits the exhaust manifold from a single exit opening in the exhaust gas manifold and enters the exhaust gas inlet half-tube via a single inlet opening in the member, the single exit opening abutting the single inlet opening.

3. An engine device comprising:

an engine having an exhaust manifold through which exhaust gas from the engine is output;

an exhaust gas purifying device that receives the exhaust gas output from the exhaust gas manifold and that purifies the received exhaust gas, the exhaust gas purifying device comprising a catalyst, an inner case within which is housed the catalyst, and an outer case, the exhaust gas purifying device having an elongated shape extending longitudinally relative to a longitudinal direction of an output shaft of the engine, and being disposed on a cylinder head of the engine at a position close to the exhaust manifold; and an exhaust gas inlet half-tube having a half-cylindrical shape in which a wall of the half-tube forms the half-cylindrical shape in a lengthwise direction of the half-tube, the half-tube being open in a transverse direction to an outer surface of the exhaust purifying device, the exhaust gas inlet half-tube being attached to and extending in said longitudinal direction of the exhaust gas purifying device to form an exhaust gas introducing passage between said exhaust manifold and said exhaust gas purifying device, the exhaust gas introducing passage being circumferentially delimited by said wall of the half-tube along part of a circumference of the passage and by an outer surface of an adjacent portion of the exhaust gas purifying device along a remaining part of said circumference of the passage; and wherein the cylinder head includes a plurality of filter support bodies which supports the exhaust gas purifying device, the exhaust gas purifying device being connected to the exhaust manifold, and one end of the exhaust gas purifying device and an other end in the longitudinal direction being detachably connected to the cylinder head through the plurality of filter support bodies;

wherein an exhaust gas inflow opening and an exhaust gas outflow opening are respectively disposed on said one end of the exhaust gas purifying device and said other end, and said exhaust gas inlet half-tube covers the exhaust gas inflow opening;

wherein the exhaust gas inlet half-tube has a first end at said exhaust gas inflow opening at said one end of the exhaust gas purifying device and has a second end at which is received exhaust gas from the exhaust manifold, and wherein a first opening at said second end of the exhaust gas inlet half-tube is provided at a longitudinal center region of the exhaust gas purifying device and communicates with and is connected to the exhaust manifold, and wherein said exhaust gas introducing passage extends from said second end to said first end; and wherein all exhaust gas flow into the exhaust gas purifying device exits the exhaust manifold from a single exit opening in the exhaust gas manifold and enters the exhaust gas inlet half-tube via a single inlet opening in the exhaust gas inlet half-tube, the single exit opening abutting the single inlet opening.

\* \* \* \* \*